(12) United States Patent
Moon et al.

(10) Patent No.: US 11,327,613 B2
(45) Date of Patent: May 10, 2022

(54) INPUT SENSING UNIT AND DISPLAY DEVICE HAVING THE SAME

(71) Applicant: Samsung Display Co., Ltd., Yongin-si (KR)

(72) Inventors: Dongjin Moon, Cheonan-si (KR); Yeri Jeong, Suwon-si (KR); InYoung Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/014,955

(22) Filed: Sep. 8, 2020

(65) Prior Publication Data

US 2021/0173518 A1 Jun. 10, 2021

(30) Foreign Application Priority Data

Dec. 4, 2019 (KR) .................. 10-2019-0159958

(51) Int. Cl.
*G06F 3/044* (2006.01)

(52) U.S. Cl.
CPC .......... *G06F 3/0443* (2019.05); *G06F 3/0446* (2019.05)

(58) Field of Classification Search
CPC .... G06F 3/041; G06F 3/04164; G06F 3/0446; G06F 3/0443; G06F 3/0448; G06F 2203/04111; G06F 2203/04107; G06F 3/0412; G06F 3/0416; G06F 3/044; H01L 27/323
See application file for complete search history.

(56) References Cited

U.S. PATENT DOCUMENTS

| | | | | |
|---|---|---|---|---|
| 9,939,977 | B2 * | 4/2018 | Zhou | G06F 3/0412 |
| 10,418,424 | B2 | 9/2019 | Oh et al. | |
| 10,585,526 | B2 * | 3/2020 | Kim | G06F 3/0446 |
| 10,732,762 | B2 * | 8/2020 | Na | G06F 3/03547 |
| 10,896,945 | B2 * | 1/2021 | Managaki | G06F 3/0446 |
| 10,903,285 | B2 * | 1/2021 | Kim | G06F 3/044 |
| 10,996,777 | B2 * | 5/2021 | Kim | G06F 3/0446 |
| 11,073,732 | B2 * | 7/2021 | Abe | G02F 1/1339 |

(Continued)

FOREIGN PATENT DOCUMENTS

| KR | 10-2016-0101295 | 8/2016 |
|---|---|---|
| KR | 10-2020-0033362 | 3/2020 |

*Primary Examiner* — Amy Onyekaba
(74) *Attorney, Agent, or Firm* — H.C. Park & Associates, PLC

(57) ABSTRACT

An sensing unit including a first conductive layer including a first line portion including a first auxiliary sensing line, a second auxiliary sensing line, and a connection line, an insulating layer and a second conductive layer disposed on the insulating layer. The second conductive layer includes an electrode portion including a first sensing pattern and a second sensing pattern and a second line portion including a first sensing line overlapping the first auxiliary sensing line and connected to the first sensing pattern and a second sensing line overlapping the second auxiliary sensing line. The first sensing line is disposed between the second sensing pattern and the second sensing line, the connection line does not overlap the first auxiliary sensing line, crosses the first sensing line in a plan view, and connects the second sensing line to the second sensing pattern through contact holes defined through the insulating layer.

19 Claims, 17 Drawing Sheets

(56) References Cited

U.S. PATENT DOCUMENTS

| | | | |
|---|---|---|---|
| 2008/0018611 A1* | 1/2008 | Serban | H03K 17/975 |
| | | | 345/173 |
| 2010/0245269 A1* | 9/2010 | Jeong | H01L 51/524 |
| | | | 345/173 |
| 2011/0157039 A1* | 6/2011 | Shin | G06F 3/0446 |
| | | | 345/173 |
| 2014/0042398 A1* | 2/2014 | Choi | H01L 27/3244 |
| | | | 257/40 |
| 2014/0078077 A1* | 3/2014 | Choi | H01L 27/323 |
| | | | 345/173 |
| 2016/0202831 A1* | 7/2016 | Kim | G06F 3/0412 |
| | | | 345/173 |
| 2016/0239131 A1* | 8/2016 | Kang | G06F 3/0446 |
| 2016/0299630 A1* | 10/2016 | Park | G06F 3/044 |
| 2017/0102818 A1* | 4/2017 | Ahn | G06F 3/04164 |
| 2017/0123538 A1* | 5/2017 | Kuo | G06F 3/0446 |
| 2017/0123572 A1* | 5/2017 | Song | G06F 3/0446 |
| 2018/0033831 A1* | 2/2018 | An | G06F 3/044 |
| 2018/0033833 A1* | 2/2018 | An | H01L 51/5256 |
| 2018/0173066 A1* | 6/2018 | Chen | G02F 1/1345 |
| 2019/0018530 A1* | 1/2019 | Lee | H01L 27/3244 |
| 2019/0056819 A1* | 2/2019 | Moon | G06F 3/0412 |
| 2019/0138131 A1* | 5/2019 | Kim | G06F 3/0416 |
| 2019/0163304 A1* | 5/2019 | Shim | H01L 51/0097 |
| 2019/0237533 A1* | 8/2019 | Kim | H01L 51/5246 |
| 2019/0243173 A1* | 8/2019 | Shiina | G02F 1/133512 |
| 2019/0250746 A1* | 8/2019 | Han | G06F 3/0412 |
| 2019/0258338 A1* | 8/2019 | Park | G06F 3/044 |
| 2019/0294278 A1* | 9/2019 | Kim | G06F 3/0446 |
| 2019/0302942 A1* | 10/2019 | Kim | G06F 3/047 |
| 2019/0346943 A1* | 11/2019 | Kim | G06F 3/04164 |
| 2020/0089369 A1* | 3/2020 | Bang | G06F 3/0448 |
| 2021/0109620 A1* | 4/2021 | Aoki | G06F 3/0412 |

* cited by examiner

INPUT SENSING UNIT AND DISPLAY DEVICE HAVING THE SAME

CROSS-REFERENCE TO RELATED APPLICATION

This application claims priority from and the benefit of Korean Patent Application No. 10-2019-0159958, filed on Dec. 4, 2019, which is hereby incorporated by reference for all purposes as if fully set forth herein.

BACKGROUND

Field

Exemplary embodiments of the present invention relate to a display device. More particularly, the exemplary embodiments relate to an sensing unit and a display device having the sensing unit.

Discussion of the Background

A display device includes a display panel displaying an image and an sensing unit sensing an external input. The display panel includes a display area where the image is actually viewed from the outside. The sensing unit includes a sensing area where the external input is sensed and a peripheral area defined adjacent to the sensing area and provided with signal lines arranged therein. The signal lines arranged in the peripheral area are respectively connected to sensing electrodes arranged in the sensing area.

The display device displays the image through the display area having various shapes and sizes. The sensing area and the peripheral area of the sensing unit are defined in consideration of the shape of the display area. In recent years, some lines of the sensing lines arranged in the peripheral area cross each other in a plan view due to the various shapes of the display area, which can increase the likelihood of a short-circuit.

The above information disclosed in this Background section is only for understanding of the background of the inventive concepts, and, therefore, it may contain information that does not constitute prior art.

SUMMARY

Exemplary embodiments of the present invention relate to an sensing unit capable of preventing a short-circuit between sensing lines crossing each other in a plan view among sensing lines.

Exemplary embodiments of the present invention relate to a display device having the sensing unit.

Additional features of the inventive concepts will be set forth in the description which follows, and in part will be apparent from the description, or may be learned by practice of the inventive concepts.

Exemplary embodiments of the inventive concepts provide an sensing unit including a first conductive layer including a first line portion comprising a first auxiliary sensing line, a second auxiliary sensing line, and a connection line whose one end is connected to the second auxiliary sensing line, an insulating layer covering the first conductive layer, and a second conductive layer disposed on the insulating layer. The second conductive layer includes an electrode portion including a first sensing pattern and a second sensing pattern spaced apart from the first sensing pattern in a plan view and a second line portion including a first sensing line overlapping the first auxiliary sensing line and electrically connected to the first sensing pattern and a second sensing line overlapping the second auxiliary sensing line and spaced apart from the first sensing line. The first sensing line is disposed between the second sensing pattern and the second sensing line, and the connection line does not overlap the first auxiliary sensing line, crosses the first sensing line in the plan view, and electrically connects the second sensing line to the second sensing pattern through contact holes defined through the insulating layer.

The second conductive layer may further include a connection electrode connected to an end of the second sensing pattern, and the first conductive layer further includes an auxiliary connection electrode electrically connected to the connection electrode through a first contact hole among the contact holes and connected to the other end of the connection line.

The first sensing line may be disposed between the connection line and the second sensing line, and the second sensing line is electrically connected to the second auxiliary sensing line through a second contact hole among the contact holes.

The first sensing line may include a first line portion having a first line width and a second line portion having a second line width greater than the first line width, and the connection line crosses the second line portion in the plan view.

The second line portion of the first sensing line may be greater than a line width of the second sensing line.

An opening may be defined through the second line portion of the first sensing line and extends in a longitudinal direction of the first sensing line, and the connection line may overlap the opening.

The first auxiliary sensing line may include a first auxiliary portion overlapping the first line portion and a second auxiliary portion overlapping the second line portion and spaced apart from the first auxiliary portion, and the connection line may be disposed in a space between the first auxiliary portion and the second auxiliary portion.

The second sensing line may include a first line area and a second line area, which have different line widths from each other, and the connection line may be connected to the second auxiliary sensing line overlapping the second line area having a line width greater than the first line area.

The connection line may include a first connection line crossing the first sensing line and electrically connecting the second sensing line and the second sensing pattern and a second connection line spaced apart from the first connection line, crossing the first sensing line, and electrically connecting the second sensing line and the second sensing pattern.

Each of the first connection line and the second connection line may include a plurality of sub-connection lines crossing the first sensing line and spaced apart from each other.

The electrode portion further may include a plurality of first sensing electrodes extending in a first direction and arranged in a second direction perpendicular to the first direction and a plurality of second sensing electrodes arranged in the first direction and extending in the second direction. Each of the first sensing electrodes may include the first sensing pattern provided in plural and first connection patterns connecting the first sensing patterns, and each of the second sensing electrodes may include the second sensing pattern provided in plural. The second line portion may further include a plurality of first sensing lines respectively connected to the first sensing electrodes and a plurality of second sensing lines respectively connected to the second sensing electrodes.

The first sensing line may be one first sensing line closest to the second sensing lines among the first sensing lines, and the second sensing line may be one second sensing line closest to the first sensing lines among the second sensing lines.

The second sensing lines may include first lines and second lines spaced apart from the first lines with the second sensing electrodes interposed therebetween, the first lines are respectively connected to one ends of corresponding second sensing electrodes among the second sensing electrodes, and the second lines are respectively connected to the other ends of the other corresponding second sensing electrodes among the second sensing electrodes.

The first conductive layer may include second connection patterns that electrically connect the second sensing patterns to each other.

Another exemplary embodiment of the inventive concepts provides a display device including a display panel and an sensing unit disposed on the display panel and including a sensing area and a peripheral area adjacent to the sensing area, which are defined therein. The sensing unit includes an electrode portion overlapping the sensing area and including a first sensing electrode and a second sensing electrode spaced apart from the first sensing electrode in a plan view, a line portion overlapping the peripheral area and including a first sensing line connected to the first sensing electrode and a second sensing line spaced apart from the first sensing line, and a connection portion disposed on a different layer from the first sensing line and the second sensing line disposed on the same layer as the first sensing line and electrically connecting the second sensing line and the second sensing electrode. The connection line crosses the first sensing line disposed between the second sensing electrode and the second sensing line in a plan view and is insulated from the first sensing line.

The display device may further include a connection electrode connected to an end of the second sensing electrode. One end of the connection line may be electrically connected to the connection electrode, and the other end of the connection line may be electrically connected to the second sensing line.

The sensing unit may include a first insulating layer disposed on the display panel, a second insulating layer covering the connection line disposed on the first insulating layer, and a third insulating layer covering the electrode portion and the line portion, which are disposed on the second insulating layer.

Each of the first sensing line and the second sensing line may include a first line disposed on the first insulating layer and a second line overlapping the first line, disposed on the second insulating layer, and electrically connected to the first line through a plurality of contact holes defined through the second insulating layer.

Another exemplary embodiment of the inventive concepts provides an sensing unit including a first insulating layer including a sensing area and a peripheral area adjacent to the sensing area, a first conductive layer disposed on the first insulating layer and including a connection line overlapping the peripheral area and a first electrode portion overlapping the sensing area, a second insulating layer disposed on the first conductive layer, and a line portion disposed on the second insulating layer and including a second electrode portion including first and second sensing electrodes overlapping the sensing area and spaced apart from each other, a first sensing line overlapping the peripheral area and connected to the first sensing electrode, and a second sensing line spaced apart from the second sensing electrode with the first sensing line interposed therebetween. The connection line crosses the first sensing line in a plan view and electrically connects the second sensing electrode and the second sensing line through a contact hole defined through the second insulating layer.

The contact hole may include a first contact hole through which the second sensing electrode is electrically connected to one end of the connection line and a second contact hole through which the second sensing line is electrically connected to the other end of the connection line, and the first sensing line may overlap between the first contact hole and the second contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
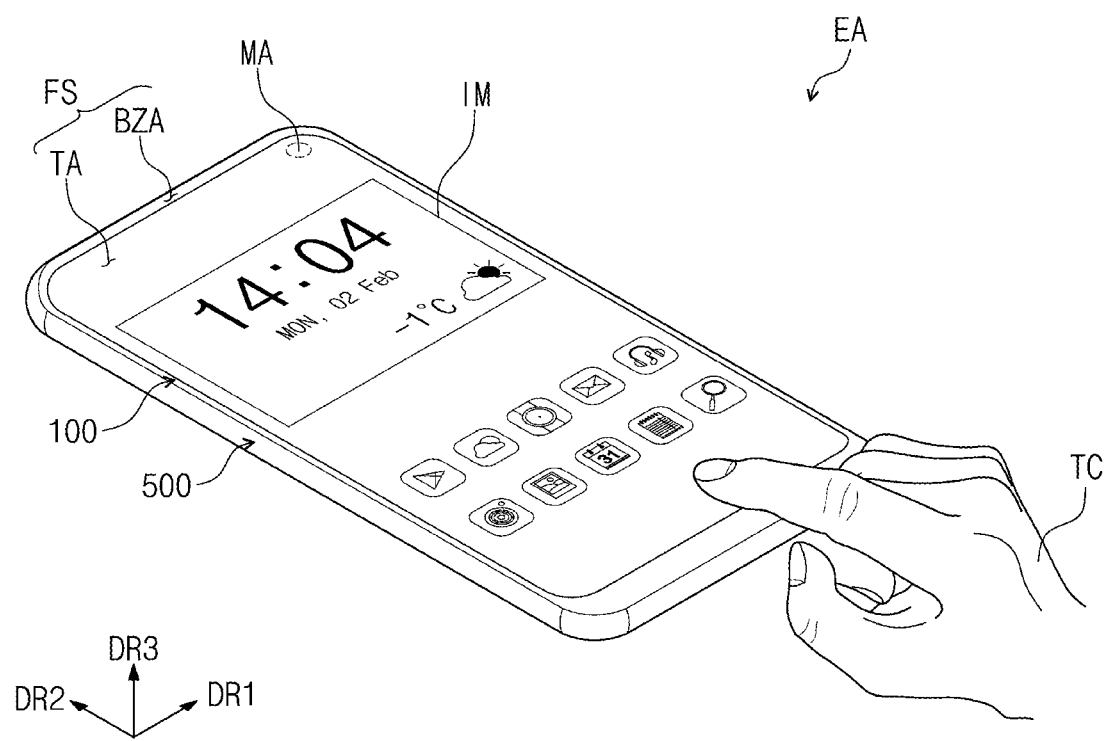
FIG. 1 is an assembled perspective view showing an electronic apparatus according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the inventive concepts will be explained in detail with reference to the accompanying drawings.

Figure 2:
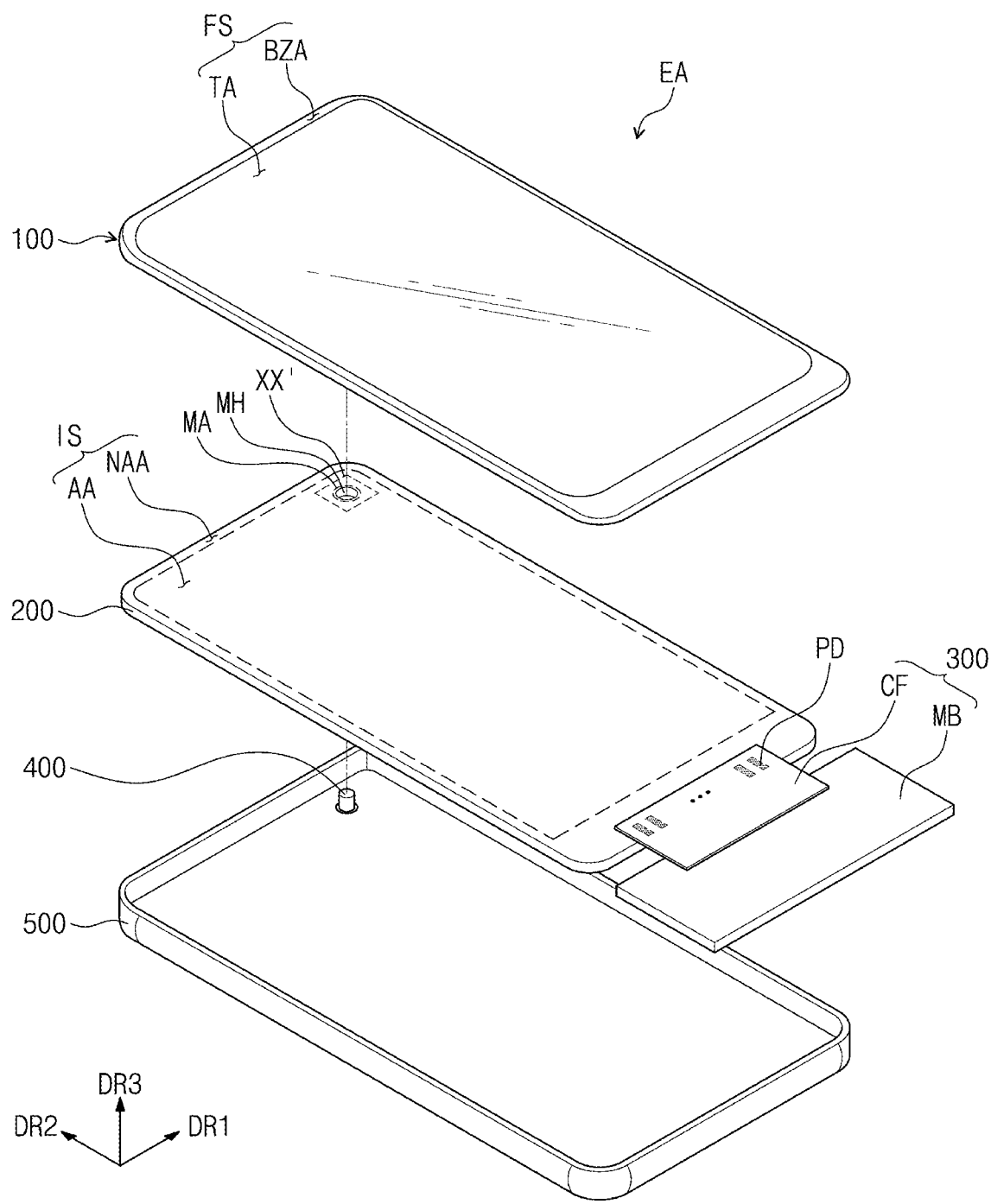
FIG. 2 is an exploded perspective view showing an electronic apparatus according to an exemplary embodiment of the present invention.

FIG. 1 is an assembled perspective view showing an electronic apparatus EA according to an exemplary embodiment of the present invention. FIG. 2 is an exploded perspective view showing the electronic apparatus EA according to an exemplary embodiment of the present invention.

The electronic apparatus EA may be an apparatus activated in response to an electrical signal. The electronic apparatus EA may include various embodiments. The electronic apparatus EA may be a tablet computer, a notebook computer, a computer, or a smart television. In the present exemplary embodiment, a smart phone will be described as a representative example of the electronic apparatus EA.

Referring to FIG. 1, the electronic apparatus EA may display an image IM through a front surface FS. The front surface FS may include a transmission area TA and a bezel area BZA defined adjacent to the transmission area TA.

The front surface FS is defined to be substantially parallel to a surface defined by a first direction DR1 and a second direction DR2. A normal line direction of the front surface FS, i.e., a thickness direction of the electronic apparatus EA, may indicate a third direction DR3. In the following descriptions, the expression "when viewed in a plan view or in a plan view" may mean a state of being viewed in the third direction DR3. Front (or upper) and rear (or lower) surfaces of each layer or each unit are distinguished from each other in the third direction DR3. However, directions indicated by the first, second, and third directions DR1, DR2, and DR3 are relative to each other, and thus, the directions indicated by the first, second, and third directions DR1, DR2, and DR3 may be changed to other directions, for example, opposite directions.

The electronic apparatus EA may display the image IM through the transmission area TA. The image IM may include a still image and a motion image. FIG. 1 shows a clock widget and application icons as a representative example of the image IM.

The transmission area TA may have a quadrangular shape parallel to each of the first direction DR1 and the second direction DR2. However, this is merely exemplary. The transmission area TA may have a variety of shapes, and the inventive concepts should not be particularly limited.

The bezel area BZA may surround the transmission area TA. However, this is merely exemplary. The bezel area BZA may be disposed adjacent to only one side of the transmission area TA or may be omitted entirely. The electronic apparatus according to the exemplary embodiment of the present invention may include various embodiments, and it should not be particularly limited.

The electronic apparatus EA may sense a user input TC applied thereto from the outside. The user input TC may include external inputs of various forms, such as a part of the user's body, light, heat, or pressure. In addition, the electronic apparatus EA may sense the external inputs, e.g., a proximity input, applied when approaching close to or adjacent to the electronic apparatus EA as well as a touch input.

In the present exemplary embodiment, the user input TC is shown as a touch operation using the user's hand applied to the front surface FS. However, this is merely exemplary. As described above, the user input TC may be provided in various forms, and the electronic apparatus EA may sense the user input TC applied to a side or rear surface of the electronic apparatus EA depending on a structure of the electronic apparatus EA, and, it should not be limited to a particular embodiment.

Referring to FIG. 2, the electronic apparatus EA may include a window 100, a display module 200, a circuit board 300, an electronic module 400, and an outer case 500. The window 100 and the outer case 500 are coupled to each other to define an exterior of the electronic apparatus EA.

The window 100 may be disposed on the display module 200 and may cover a front surface IS of the display module 200. The window 100 may include an optically transparent insulating material. For example, the window 100 may include glass or plastic. The window 100 may have a single-layer or multi-layer structure. For example, the window 100 may have a stack structure of a plurality of plastic films attached to each other by an adhesive or may have a stack structure of a glass substrate and a plastic film attached to the glass substrate by an adhesive.

The window 100 may include a front surface FS exposed to the outside. The front surface FS of the electronic apparatus EA may be defined by the front surface FS of the window 100. The transmission area TA may be an optically transparent area. The transmission area TA may have a shape corresponding to an active area AA defined in the display module 200. For example, the transmission area TA may overlap an entire surface or at least a portion of the active area AA. The image IM displayed through the active area AA of the display module 200 may be viewed from the outside through the transmission area TA.

The bezel area BZA may have a relatively lower light transmittance than the transmission area TA. The bezel area BZA may define the shape of the transmission area TA. The bezel area BZA may be defined adjacent to the transmission area TA and may surround the transmission area TA.

The bezel area BZA may have a predetermined color. When the window 100 includes a glass or plastic substrate, the bezel area BZA may be a color layer printed or deposited on one surface of the glass or plastic substrate. Alternatively, the bezel area BZA may be formed by coloring a corresponding area of the glass or plastic substrate.

The bezel area BZA may cover a non-active area NAA of the display module 200 to prevent the non-active area NAA from being viewed from the outside. However, this is merely exemplary. In the window 100 according to the exemplary embodiment of the present invention, the bezel area BZA may be omitted.

The display module 200 may include a display panel DP and an sensing unit ISU, which are described with reference to FIG. 3. The display panel DP may include configurations appropriate to generate the image IM. The image IM generated by the display panel DP may be viewed from the outside by a user through the transmission area TA. The sensing unit ISU may sense the external input TC applied thereto. As described above, the sensing unit ISU may sense the external input TC provided to the window 100. In the present exemplary embodiment, the sensing unit ISU may be described as an input sensing layer.

According to the exemplary embodiment of the present invention, the front surface IS of the display module 200 may include a first area and a second area adjacent to the first area. The first area may correspond to a module area MA and the active area AA surrounding the module area MA, and the second area may correspond to the non-active area NAA. The active area AA may be activated in response to an electrical signal. The module area MA and the second area may be defined as a non-display area in which the image is not displayed.

The active area AA may be a display area through which the image IM is displayed and may be a sensing area in which the external input TC is sensed. The transmission area TA may overlap at least the active area AA. For example, the transmission area TA may overlap the entire surface or at least a portion of the active area AA. Accordingly, the user may view the image IM through the transmission area TA or may provide the external input TC through the transmission area TA. However, this is merely exemplary. In the active area AA, an area through which the image IM is displayed and an area in which the external input TC is sensed may be separated from each other. However, the inventive concepts should not be limited thereto or thereby.

The non-active area NAA may be covered by the bezel area BZA. The non-active area NAA may be disposed adjacent to the active area AA. The non-active area NAA may surround the active area AA. A driving circuit or a driving wiring line may be disposed in the non-active area NAA to drive the active area AA.

Various signal lines, pads PD, or electronic devices, which provide electrical signals to the active area AA, may be disposed in the non-active area NAA. The non-active area NAA may be covered by the bezel area BZA, and thus, the non-active area NAA may not be viewed from the outside.

In the present exemplary embodiment, the display module 200 may be assembled in a flat state such that the active area AA and the non-active area NAA face the window 100. However, this is merely exemplary. A portion of the non-active area NAA of the display module 200 may be bent. In this case, the portion of the non-active area NAA may be bent toward a rear surface of the electronic apparatus EA, and thus, the area of the bezel area BZA is reduced in the front side of the electrode apparatus EA. Alternatively, the display module 200 may have a partially-bent shape in the active area AA. In addition, the non-active area NAA may be omitted from the display module 200 according to another exemplary embodiment of the present invention.

The module area MA may have a relatively high transmittance relative to the same area as compared with the active area AA. The module area MA may be defined at a position overlapping the electronic module 400 described later when viewed in a plan view.

At least a portion of the module area MA may be surrounded by the active area AA. In the present exemplary embodiment, the module area MA may be spaced apart from the non-active area NAA. The module area MA may be defined in the active area AA such that an entire edge of the module area MA is surrounded by the active area AA.

The display module 200 may include a panel hole MH defined through the display module 200 in the module area MA. The panel hole MH may penetrate through at least one of the display panel DP and the sensing unit ISU. The edge of the module area MA may be spaced apart from an edge of the panel hole MH and may extend along the edge of the panel hole MH. The edge of the module area MA may have a shape corresponding to the panel hole MH.

The circuit board 300 may be connected to the display module 200. The circuit board 300 may include a flexible board CF and a main board MB. The flexible board CF may include an insulating film and conductive lines mounted on the insulating film. The conductive lines may be connected to the pads PD to electrically connect the circuit board 300 to the display module 200.

In the present exemplary embodiment, the flexible board CF may be bent while being assembled. Therefore, the main board MB may be disposed on the rear surface of the display module 200 and may be stably accommodated in a space provided by the outer case 500. In the present exemplary embodiment, the flexible board CF may be omitted, and in this case, the main board MB may be connected directly to the display module 200.

The main board MB may include signal lines and electronic devices, which are not shown. The electronic devices may be connected to the signal lines and may be electrically connected to the display module 200. The electronic devices may generate various electrical signals, for example, signals to generate the image IM or signals to sense the external input TC, or may process the sensed signal. A plurality of the main boards MB may be provided to respectively correspond to the electrical signals to be generated or processed. However, the inventive concepts should not be particularly limited.

In the electronic apparatus EA according to the exemplary embodiment of the present invention, the driving circuit that provides the electrical signal to the active area AA may be mounted directly on the display module 200. In this case, the driving circuit may be mounted in a chip form or may be formed together with pixels PX. In this case, the area of the circuit board 300 may be reduced, or the circuit board 300 may be omitted entirely. The electronic apparatus EA according to the exemplary embodiment of the present invention may include various embodiments, and, the electronic apparatus EA should not be particularly limited.

The electronic module 400 may be disposed under the window 100. The electronic module 400 may overlap the panel hole MH defined in the module area MA. The electronic module 400 may receive the external input transmitted through the module area MA or may provide an output through the module area MA.

Among components of the electronic module 400, a receiving unit receiving the external input or an outputting unit providing the output may overlap the module area MA in the plan view. All or a portion of the electronic module 400 may be accommodated in the module area MA or the panel hole MH. According to the present exemplary embodiment, since the electronic module 400 is disposed to overlap the active area AA, the size of the bezel area BZA may be reduced.

Figure 3:
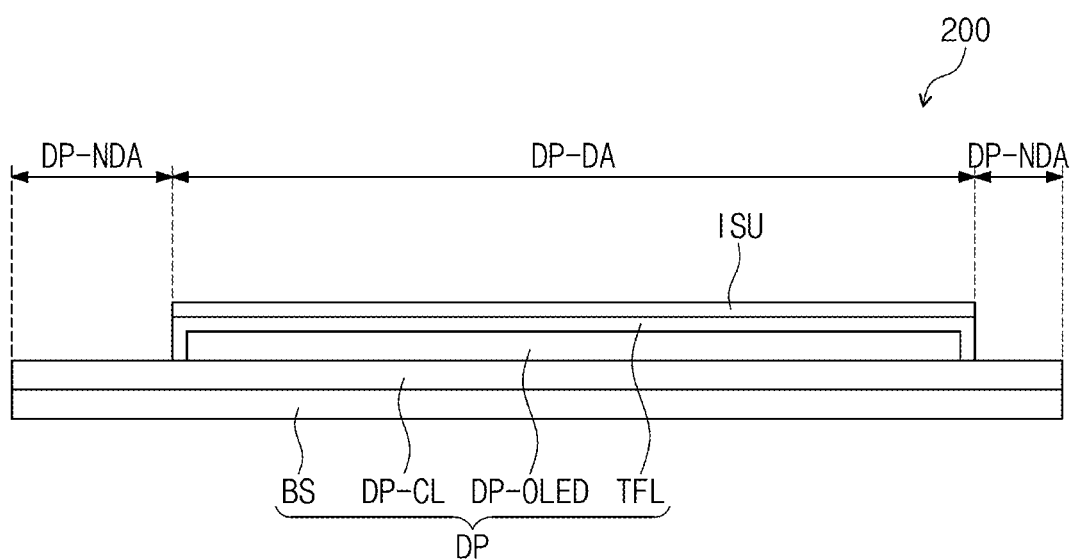
FIG. 3 is a cross-sectional view showing a display module according to an exemplary embodiment of the present invention.

FIG. 3 is a cross-sectional view showing the display module 200 according to an exemplary embodiment of the present invention.

Referring to FIG. 3, the display panel DP may include a base substrate BS, a circuit element layer DP-CL, a display element layer DP-OLED, and an insulating layer TFL, which are disposed on the base substrate BS.

According to the exemplary embodiment of the present invention, the display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot and a quantum rod. Hereinafter, the organic light emitting display panel will be described as a representative example of the display panel DP.

The display panel DP may include a display area DP-DA and a non-display area DP-NDA. The display area DP-DA of the display panel DP may correspond to the active area AA shown in FIG. 2, and the non-display area DP-NDA of the display panel DP may correspond to the non-active area NAA shown in FIG. 2.

The base substrate BS may include at least one plastic film. The base substrate BS may be a flexible substrate and may include a plastic substrate, a glass substrate, a metal substrate, or an organic/inorganic composite substrate.

The circuit element layer DP-CL may include at least one intermediate insulating layer and a circuit element. The intermediate insulating layer may include at least one intermediate inorganic layer and at least one organic layer. The circuit element may include signal lines and a pixel driving circuit.

The display element layer DP-OLED may include a plurality of display elements. As an example, the display element layer DP-OLED may be organic light emitting diodes. The display element layer DP-OLED may further include an organic layer such as a pixel definition layer.

The insulating layer TFL may encapsulate the display element layer DP-OLED. As an example, the insulating layer TFL may be a thin film encapsulation layer. The insulating layer TFL may protect the display element layer DP-OLED from moisture, oxygen, and a foreign substance, such as dust particles.

The sensing unit ISU may be disposed directly on the display panel DP to sense the input applied thereto from the outside. The input from the outside may be the user input TC described with reference to FIG. 1. In this specification, the expression "component "A" is directly disposed on component "B"" means that no intervening elements, such as an adhesive layer, are present between the component "A" and the component "B". In the present exemplary embodiment, the sensing unit ISU may be formed together with the display panel DP through successive processes.

Figure 4A:
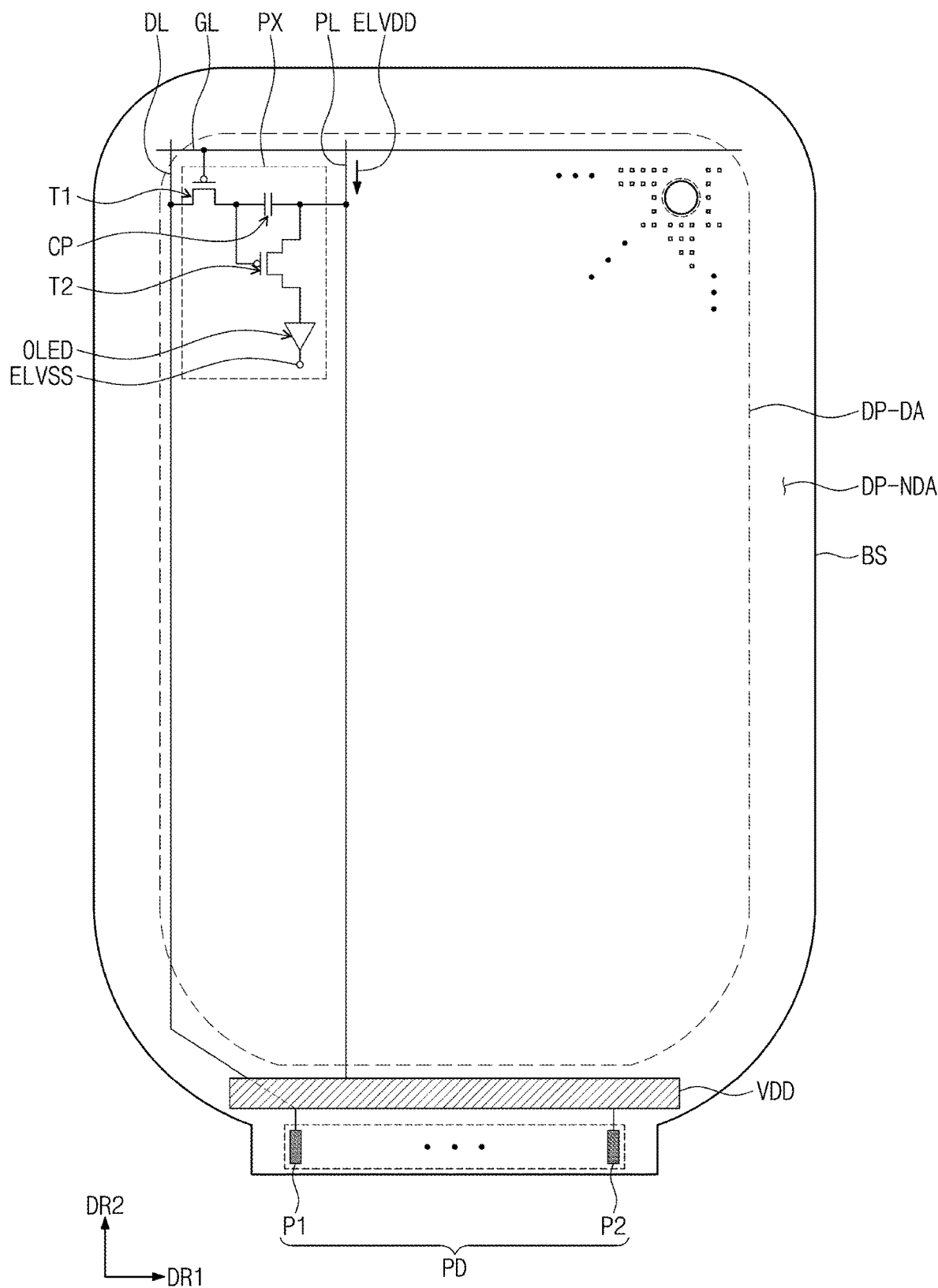
FIG. 4A is a plan view showing a display panel according to an exemplary embodiment of the present invention.
Figure 4B:
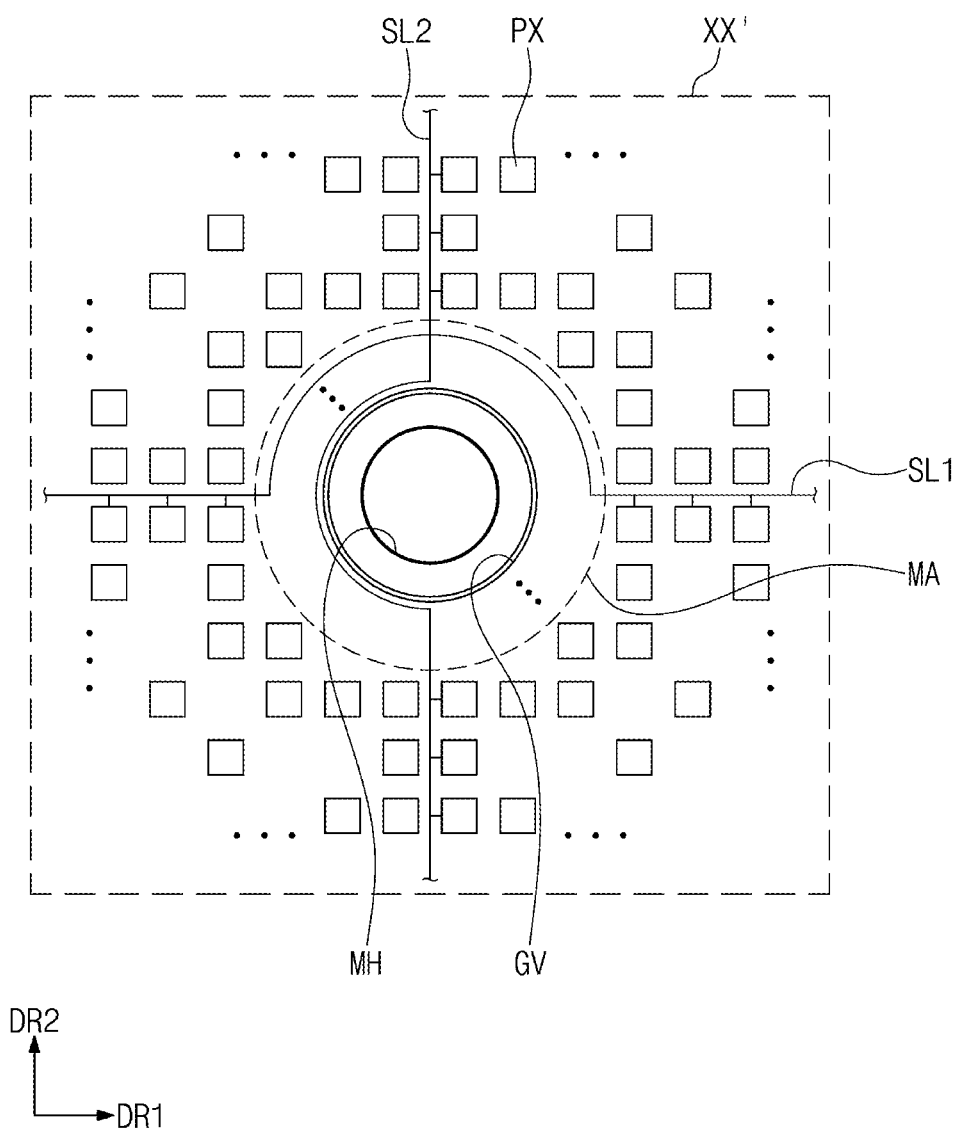
FIG. 4B is an enlarged view showing an area XX' shown in FIG. 2.
Figure 4C:
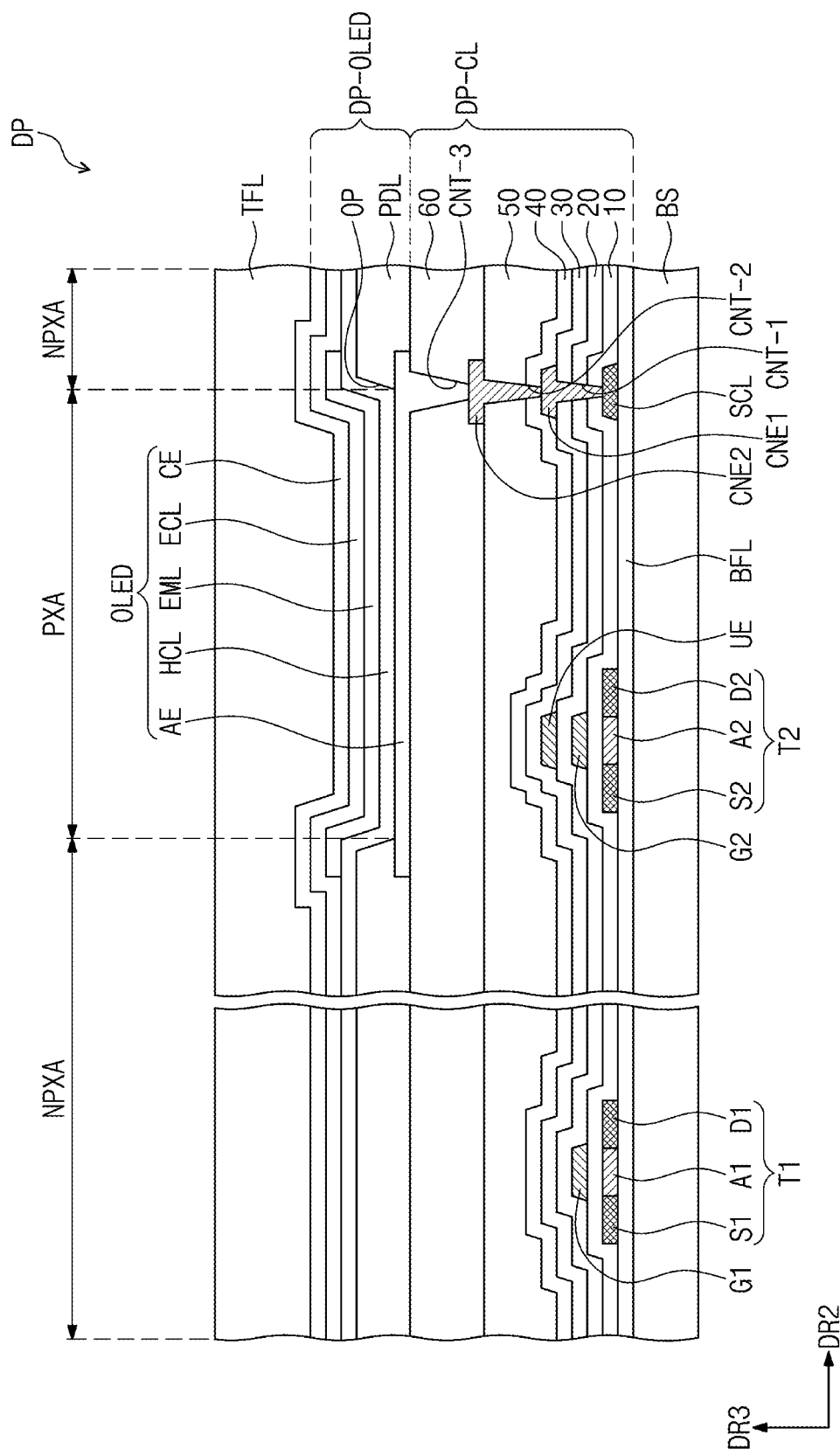
FIG. 4C is a cross-sectional view showing a portion of a display panel overlapping a display area according to an exemplary embodiment of the present invention.

FIG. 4A is a plan view showing the display panel according to an exemplary embodiment of the present invention. FIG. 4B is an enlarged view showing an area XX' shown in FIG. 2. FIG. 4C is a cross-sectional view showing a portion of the display panel overlapping a display area according to an exemplary embodiment of the present invention.

The display panel DP may include the base substrate BS, the pixels PX, the signal lines GL, DL, and PL, and the pads PD.

Referring to FIG. 4A, the display panel DP may include the base substrate BS, the pixels PX, the signal lines GL, DL, and PL, and the display pads PD. The base substrate BS may include an insulating substrate. For example, the base substrate BS may include a glass substrate, a plastic substrate, or a combination thereof.

The signal lines GL, DL, and PL may be connected to the pixels PX and may transmit the electrical signals to the pixels PX. Among the signal lines included in the display panel DP, a scan line GL, a data line DL, and a power line PL are shown as a representative example. However, these are merely exemplary. The signal lines GL, DL, and PL may further include at least one of a power line, an initialization voltage line, and a light emitting control line, and the inventive concepts should not be limited to a particular embodiment.

The pixels PX may be arranged in the display area DP-DA. In the present exemplary embodiment, a signal circuit diagram of one pixel PX among the pixels is enlarged and shown. The pixel PX may include a first transistor T1, a capacitor CP, a second transistor T2, and an organic light emitting diode OLED. The first transistor T1 may be a switching device that controls an ON/OFF of the pixel PX. The first transistor T1 may transmit or block a data signal applied thereto through the data line DL in response to a scan signal applied thereto through the scan line GL.

The capacitor CP may be connected to the first transistor T1 and the power line PL. The capacitor CP may be charged with electric charges corresponding to a difference in electric potential between the data signal provided from the first transistor T1 and a first power signal applied to the power line PL.

The second transistor T2 may be connected to the first transistor T1, the capacitor CP, and the organic light emitting diode OLED. The second transistor T2 may control a driving current flowing through the organic light emitting diode OLED in response to an amount of the electric charges charged in the capacitor CP. A turn-on time of the second transistor T2 may be determined by the amount of the electric charges charged in the capacitor CP. The second transistor T2 may apply the first power signal provided through the power line PL to the organic light emitting diode OLED during its turn-on time.

The organic light emitting diode OLED may generate the light or may control an amount of the light in response to the electrical signals. For example, the organic light emitting diode OLED may include an organic light emitting device, a quantum dot light emitting device, an electrophoretic device, or an electrowetting device.

The organic light emitting diode OLED may receive a first power source voltage ELVDD provided from the power line PL and may receive a second power source voltage ELVSS from a power electrode (not shown). The first power source voltage ELVDD may be applied to a first electrode of the organic light emitting diode OLED through the second transistor T2, and the second power source voltage ELVSS may be applied to a second electrode of the organic light emitting diode OLED through the power electrode (not shown). The second power source voltage ELVSS may be lower than the first power source voltage ELVDD.

The driving current corresponding to a difference between the first power source voltage ELVDD provided from the second transistor T2 and the second power source voltage ELVSS may flow through the organic light emitting diode OLED, and the organic light emitting diode OLED may generate the light corresponding to the driving current. However, this is merely exemplary, and each of the pixels PX may include electronic devices having various configurations and arrangements, and the inventive concepts should not be particularly limited.

The pixels PX may be arranged around the panel hole MH and may surround the panel hole MH in a plan view.

The pads PD may include a first pad P1 and a second pad P2. The first pad P1 may be provided in plural and may be respectively connected to the data lines DL. The second pad P2 may be connected to a power pattern VDD to be electrically connected to the power line PL. The display panel DP may apply the electrical signals provided thereto from the outside through the pads PD to the pixels PX. The pads PD may further include pads to receive other electrical signals in addition to the first pad P1 and the second pad P2. However, the pads PD should not be limited thereto or thereby.

In FIG. 4B, the module area MA shown in FIG. 2 is represented by a dotted line. The area XX' includes the area in which the panel hole MH is defined. Hereinafter, the display panel DP in the area where the panel hole MH is defined will be described in detail with reference to FIG. 4B.

As described above, the panel hole MH may be defined in the display area DP-DA. Accordingly, at least some of the pixels PX may be arranged adjacent to the panel hole MH. Some of the pixels PX may surround the panel hole MH.

A predetermined groove pattern GV may be defined in the module area MA. The groove pattern GV may be disposed along an edge of the panel hole MH in a plan view, and in the present exemplary embodiment, the groove pattern GV may have a circular ring shape that surrounds the panel hole MH. However, this is merely exemplary. The groove pattern GV may have a shape different from that of the panel hole MH, a polygonal shape, an oval shape, a closed line shape provided with at least a curved line, or a shape including a plurality of patterns that are partially cut, and the inventive concepts should not be limited to a specific embodiment.

The groove pattern GV may correspond to a portion recessed from the front surface of the display panel DP and may block a path through which moisture and oxygen that penetrates through the panel hole MH flows into the pixel PX.

A plurality of signal lines SL1 and SL2 connected to the pixels PX may be disposed in the module area MA. The signal lines SL1 and SL2 may be connected to the pixels PX through the module area MA. For the convenience of explanation, FIG. 4B shows a first signal line SL1 and a second signal line SL2 among the signal lines connected to the pixels PX as a representative example.

The first signal line SL1 may extend in the first direction DR1. The first signal line SL1 may be connected to pixels arranged in the same row along the first direction DR1 among the pixels PX. The first signal line SL1 will be described as corresponding to the scan line GL.

Some pixels among the pixels connected to the first signal line SL1 may be arranged at a left side with respect to the panel hole MH, and the other pixels may be disposed at a right side with respect to the panel hole MH. Therefore, the pixels arranged in the same row and connected to the first signal line SL1 may be turned on/off by the same gate signal even though some pixels are omitted with respect to the panel hole MH.

The second signal line SL2 may extend in the second direction DR2. The second signal line SL2 may be connected to pixels arranged in the same column along the second direction DR2 among the pixels PX. The second signal line SL2 will be described as corresponding to the data line DL.

Some pixels among the pixels connected to the second signal line SL2 may be arranged at an upper side with respect to the panel hole MH, and the other pixels may be disposed at a lower side with respect to the panel hole MH. Therefore, the pixels arranged in the same column and connected to the second signal line SL2 may receive the data signal through the same data line even though some pixels are omitted with respect to the panel hole MH.

Referring to FIG. 4C, the display panel DP may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned by a photolithography process. The semiconductor pattern, the conductive pattern, and the signal line included in the circuit element layer DP-CL and the display element layer DP-OLED may be formed. The display panel DP shown in FIG. 4C will be described as including additional elements when compared with the first transistor T1 and the second transistor T2 of the pixel PX shown in FIG. 4B.

The base substrate BS may include a synthetic resin film. The synthetic resin film may include a heat-curable resin. The base substrate BS may have a multi-layer structure. For instance, the base substrate BS may have a three-layer structure of a synthetic resin layer, an adhesive layer, and a synthetic resin layer. In particular, the synthetic resin layer may be a polyimide-based resin layer, and a material for the synthetic resin layer should not be particularly limited. The synthetic resin layer may include at least one of an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin. The base substrate BS may include a glass substrate, a metal substrate, or an organic/inorganic composite substrate.

At least one inorganic layer may be formed on an upper surface of the base substrate BS. The inorganic layer may include at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer. In the present exemplary embodiment, the display panel DP may include a buffer layer BFL.

The buffer layer BFL may increase a coupling force between the base substrate BS and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon. However, the inventive concepts should not be limited thereto or thereby. The semiconductor pattern may include amorphous silicon or metal oxide.

FIG. 4C shows only a portion of the semiconductor pattern, and the semiconductor pattern may be further disposed in other areas of the pixels in a plan view. The semiconductor pattern may be arranged with a specific rule over the pixels PX. The semiconductor pattern may have different electrical properties depending on whether it is doped. The semiconductor pattern may include a doped region and a non-doped region. The doped region may be doped with an N-type dopant or a P-type dopant. A P-type transistor may include a doped region doped with the P-type dopant.

The doped region may have a conductivity greater than that of the non-doped region and may substantially serve as an electrode or signal line. The non-doped region may substantially correspond to an active region (or channel). In other words, a portion of the semiconductor pattern may be the active region of the transistor, another portion of the semiconductor pattern may be a source or a drain of the transistor, and still another portion of the semiconductor pattern may be a connection electrode or a connection signal line.

As shown in FIG. 4C, a source S1, an active region A1, and a drain D1 of the first transistor T1 may be formed from the semiconductor pattern, and a source S2, an active region A2, and a drain D2 of the second transistor T2 may be formed from the semiconductor pattern. The sources S1 and S2 and the drains D1 and D2 may extend in opposite directions to each other from the active regions A1 and A2. FIG. 4C shows a portion of a connection signal line SCL formed from the semiconductor pattern. Although not shown in figures, the connection signal line SCL may be connected to the drain D2 of the second transistor T2 in a plan view.

A first insulating layer 10 may be disposed on the buffer layer BFL. The first insulating layer 10 may commonly overlap the pixels PX and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon oxynitride, zirconium oxide, and hafnium oxide. In the present exemplary embodiment, the first insulating layer 10 may have a single-layer structure of a silicon oxide layer. Not only the first insulating layer 10, but also an insulating layer of the circuit element layer DP-CL described later may be an inorganic layer and/or an organic layer and may have a single-layer or multi-layer structure. The inorganic layer may include at least one of the above-mentioned materials.

Gates G1 and G2 may be disposed on the first insulating layer 10. The gates G1 and G2 may be portions of a metal pattern. The gates G1 and G2 may overlap the active regions A1 and A2, respectively. The gates G1 and G2 may be used as a mask in a process of doping the semiconductor pattern.

A second insulating layer 20 may be disposed on the first insulating layer 10 and may cover the gates G1 and G2. The second insulating layer 20 may commonly overlap the pixels PX. The second insulating layer 20 may be an inorganic layer and/or an organic layer and may have a single-layer or multi-layer structure. In the present exemplary embodiment, the second insulating layer 20 may have a single-layer structure of silicon oxide.

An upper electrode UE may be disposed on the second insulating layer 20. The upper electrode UE may overlap the gate G2 of the second transistor T2. The upper electrode UE may be a portion of a metal pattern. A portion of the gate G2 and the upper electrode UE overlapping the portion of the gate G2 may define the capacitor CP (refer to FIG. 4A).

A third insulating layer 30 may be disposed on the second insulating layer 20 and may cover the upper electrode UE. In the present exemplary embodiment, the third insulating layer 30 may have a single-layer structure of a silicon oxide layer. A first connection electrode CNE1 may be disposed on the third insulating layer 30. The first connection electrode CNE1 may be connected to the connection signal line SCL through a contact hole CNT-1 defined through the first, second, and third insulating layers 10, 20, and 30.

A fourth insulating layer 40 may be disposed on the third insulating layer 30 to cover the first connection electrode CNE1. The fourth insulating layer 40 may have a single-layer structure of a silicon oxide layer. A fifth insulating layer 50 may be disposed on the fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer. The first electrode AE may be disposed on the sixth insulating layer 60. The first electrode AE may be connected to the second connection electrode CNE2 through a contact hole CNT-3 defined through the sixth insulating layer 60. An opening OP may be defined through a pixel definition layer PDL. At least a portion of the first electrode AE may be exposed through the opening OP of the pixel definition layer PDL.

As shown in FIG. 4C, the display area DA may include a pixel area PXA and a light blocking area NPXA defined adjacent to the pixel area PXA. The light blocking area NPXA may surround the pixel area PXA. In the present exemplary embodiment, the pixel area PXA may be defined to correspond to the portion of the first electrode AE exposed through the opening OP.

A hole control layer HCL may be commonly disposed in the pixel area PXA and the light blocking area NPXA. The hole control layer HCL may include a hole transport layer and may further include a hole injection layer. A light emitting layer EML may be disposed on the hole control layer HCL. The light emitting layer EML may be disposed in an area corresponding to the opening OP. That is, the light emitting layer EML may be formed in each of the pixels PX after being divided into portions.

An electron control layer ECL may be disposed on the light emitting layer EML. The electron control layer ECL may include an electron transport layer and may further include an electron injection layer. The hole control layer HCL and the electron control layer ECL may be commonly formed in the plural pixels using an open mask. The second electrode CE may be disposed on the electron control layer ECL. The second electrode CE may have an integral shape and may be commonly disposed in the pixels PX.

The insulating layer TFL may be disposed on the second electrode CE. According to the present disclosure, the insulating layer TFL may include a plurality of thin layers. For instance, although not shown in figures, the insulating layer TFL may have a structure in which an inorganic layer and an organic layer are stacked.

Figure 5:
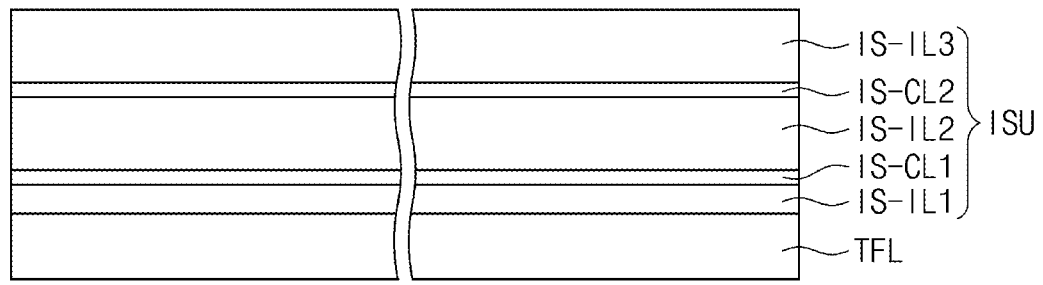
FIG. 5 is a cross-sectional view showing an sensing unit according to an exemplary embodiment of the present invention.

FIG. 5 is a cross-sectional view showing the sensing unit according to an exemplary embodiment of the present invention.

Referring to FIG. 5, the sensing unit ISU may include a first sensing insulating layer IS-IL1, a first conductive layer IS-CL1, a second sensing insulating layer IS-IL2, a second conductive layer IS-CL2, and a third sensing insulating layer IS-IL3. The first sensing insulating layer IS-IL1 may be disposed directly on the insulating layer TFL. However, the inventive concepts should not be limited thereto or thereby. The first sensing insulating layer IS-IL1 may be omitted, and in this case, the first conductive layer IS-CL1 may be disposed directly on the insulating layer TFL.

Each of the first conductive layer IS-CL1 and the second conductive layer IS-CL2 may have a single-layer structure or a multi-layer structure of layers stacked in the third direction DR3. The conductive layer having the multi-layer structure may include at least two layers among transparent conductive layers and metal layers. The conductive layer having the multi-layer structure may include metal layers including different metals from each other.

The transparent conductive layer may include indium tin oxide (ITO), indium zinc oxide (IZO), zinc oxide (ZnO), indium tin zinc oxide (ITZO), PEDOT, a metal nanowire, or a graphene. The metal layer may include molybdenum, silver, titanium, copper, aluminum, or alloys thereof. For instance, each of the first conductive layer IS-CL1 and the second conductive layer IS-CL2 may have a three-layer structure of titanium/aluminum/titanium. A metal layer having a relatively high durability and a relatively low reflectance may be applied as an outer layer, and a metal layer having a high electrical conductivity may be applied as an inner layer.

According to the present exemplary embodiment, each of the first conductive layer IS-CL1 and the second conductive layer IS-CL2 may include a conductive pattern. For example, the first conductive layer IS-CL1 may include a first conductive pattern including a first electrode portion and a first line portion, and the second conductive layer IS-CL2 may include a second conductive pattern including a second electrode portion and a second line portion.

Each of the first sensing insulating layer IS-IL1, the second sensing insulating layer IS-IL2, and the third sensing insulating layer IS-IL3 may include an inorganic layer or an organic layer. In the present exemplary embodiment, the first sensing insulating layer IS-IL1 may be an inorganic layer. However, the inventive concepts should not be limited thereto or thereby. For instance, the first sensing insulating layer IS-IL1 and the second sensing insulating layer IS-IL2 may be the inorganic layer, and the third sensing insulating layer IS-IL3 may be the organic layer.

Figure 6:
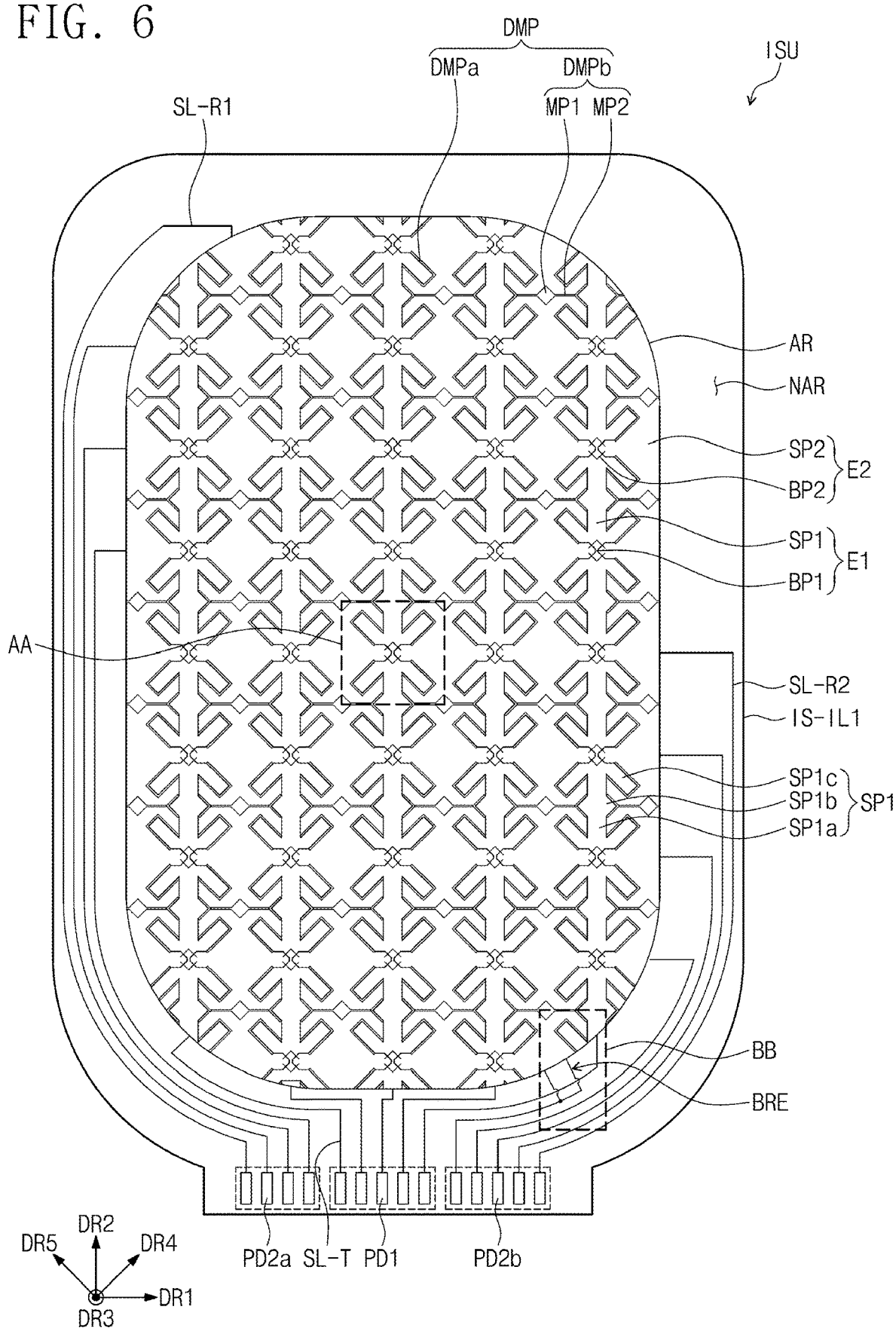
FIG. 6 is a plan view showing an sensing unit according to an exemplary embodiment of the present invention.
Figure 7A:
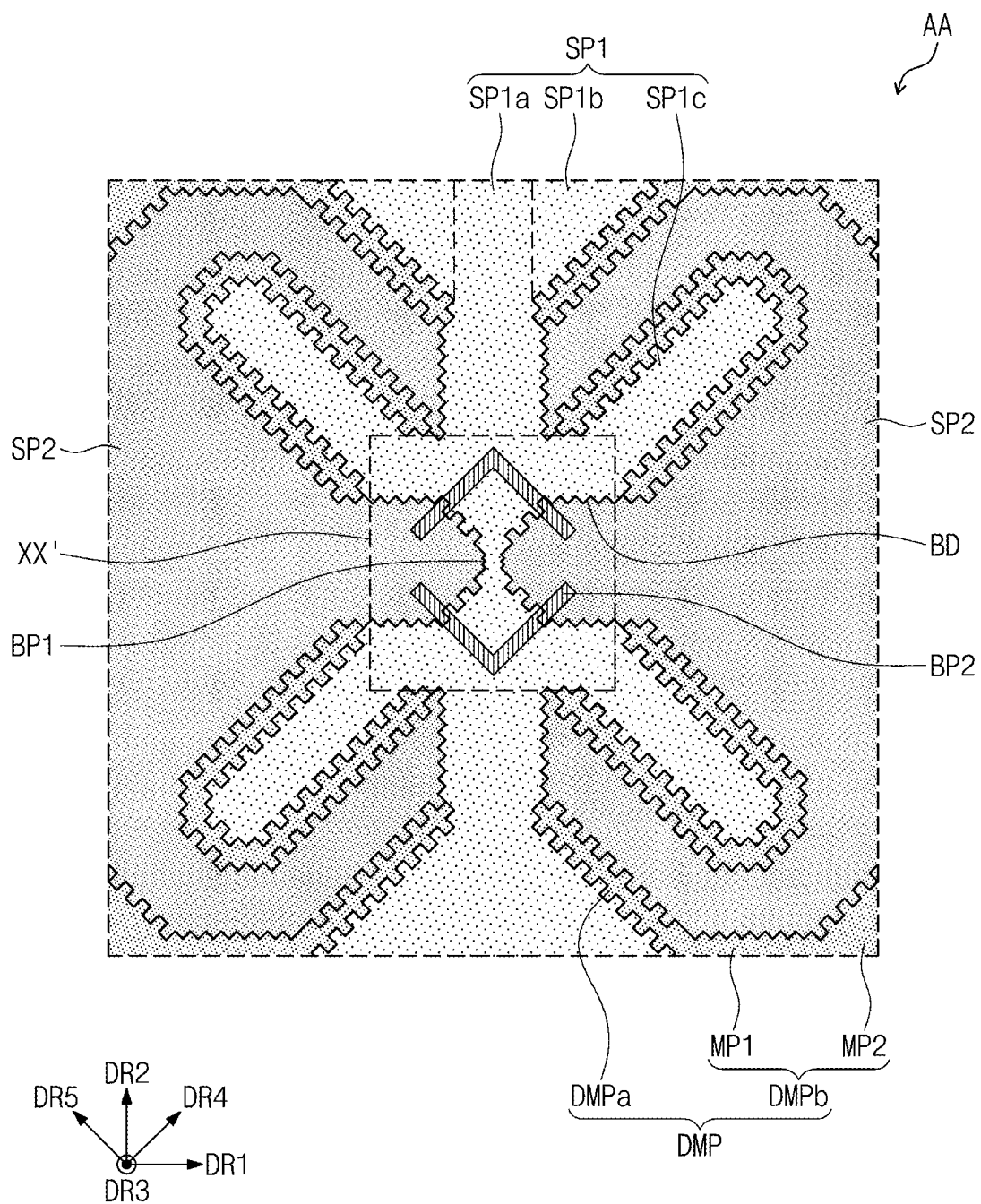
FIG. 7A is an enlarged view showing an area AA shown in FIG. 6 according to an exemplary embodiment of the present invention.
Figure 7B:
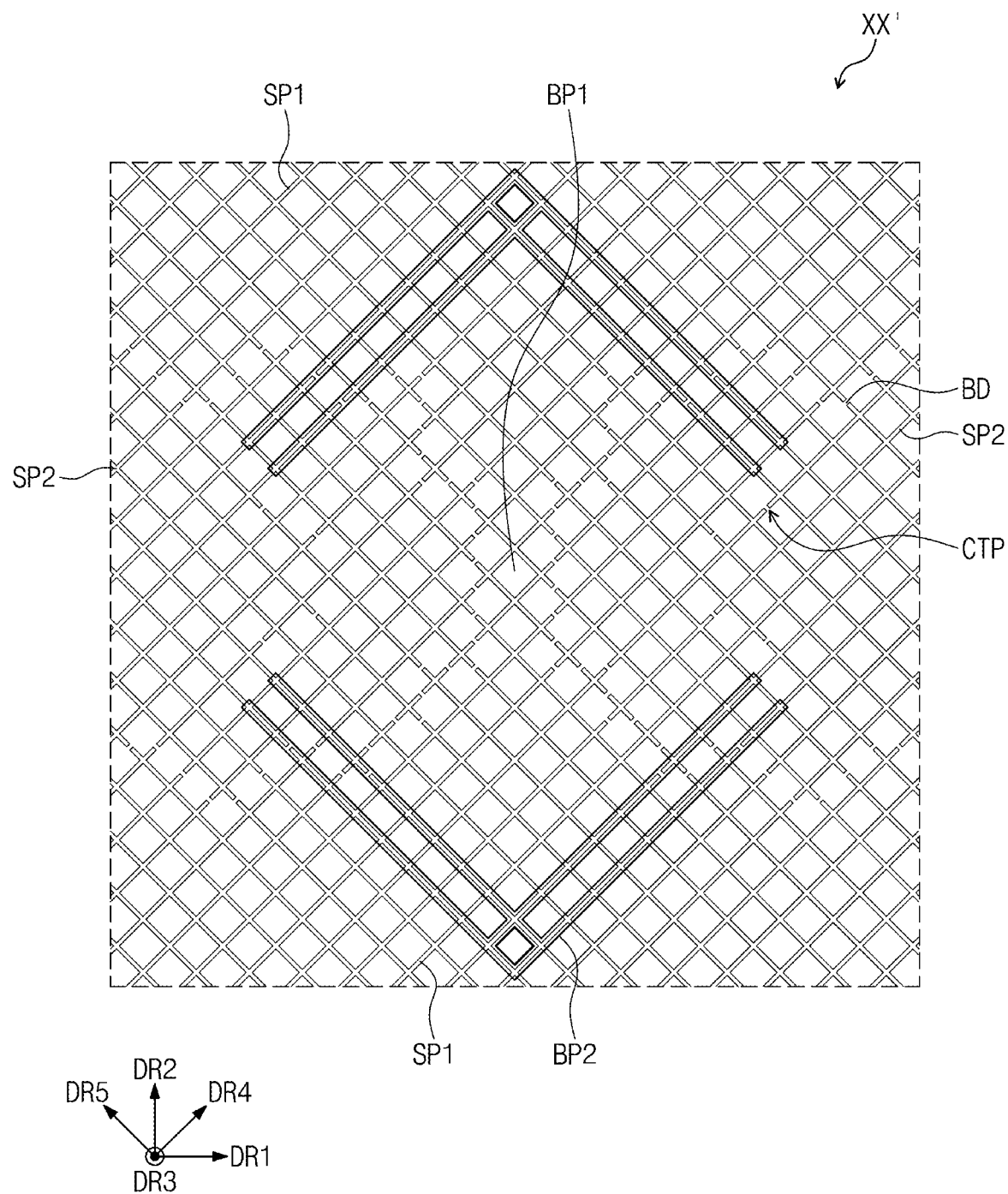
FIG. 7B is an enlarged view showing an area shown in FIG. 7A.

FIG. 6 is a plan view showing the sensing unit ISU according to an exemplary embodiment of the present invention. FIG. 7A is an enlarged view showing an area AA shown in FIG. 6 according to an exemplary embodiment of the present invention. FIG. 7B is an enlarged view showing an area shown in FIG. 7A.

Referring to FIG. 6, the sensing unit ISU may include a sensing area AR and a peripheral area NAR, which are defined therein. The sensing area AR and the peripheral area NAR of the sensing unit ISU may correspond to the active area AA and the non-active area NAA of the display module 200 shown in FIG. 2. The sensing area AR may be activated in response to an electrical signal. For example, the sensing area AR may be an area in which an input is sensed. The peripheral area NAR may surround the sensing area AR.

Although not shown in FIG. 6, a hole area corresponding to the panel hole MH shown in FIG. 2 may be defined in the sensing area AR of the sensing unit ISU. The hole area may be defined by removing all or at least a portion of components forming the sensing unit ISU.

In detail, referring to FIGS. 5 and 6, the sensing unit ISU may include first sensing electrodes E1, second sensing electrodes E2, dummy patterns DMP, sensing lines SL-T, SL-R1, and SL-R2, and pad portions PD1, PD2a, and PD2b. The first sensing electrodes E1, the second sensing electrodes E2, and the dummy patterns DMP may be disposed in the sensing area AR, and the sensing lines SL-T, SL-R1, and SL-R2 may be disposed in the peripheral area NAR.

The sensing unit ISU may obtain information about the external input based on a variation in capacitance between the first sensing electrodes E1 and the second sensing electrodes E2. The first sensing electrodes E1 may be arranged in the first direction DR1 and may extend in the second direction DR2. Each of the first sensing electrodes E1 may include first sensing patterns SP1 and first connection patterns BP1. The first connection patterns BP1 may electrically connect two first sensing patterns SP1 adjacent to each other.

The second sensing electrodes E2 may extend in the first direction DR1 and may be arranged in the second direction DR2. Each of the second sensing electrodes E2 may include second sensing patterns SP2 and second connection patterns BP2. The second connection patterns BP2 may electrically connect two second sensing patterns SP2 adjacent to each other. The two adjacent second sensing patterns SP2 may be connected to each other by the two connection patterns BP2. However, the inventive concepts should not be limited thereto or thereby.

According to the present exemplary embodiment, the first sensing patterns SP1, the first connection patterns BP1, and the second sensing patterns SP2 may be included in the second conductive layer IS-CL2. The first sensing patterns SP1, the second sensing patterns SP2, and the first connection patterns BP1 may be formed on the second sensing insulating layer IS-IL2 through the same process and may be defined as a second electrode portion of the second conductive layer IS-CL2.

The second connection patterns BP2 may be included in the first conductive layer IS-CL1. The second connection patterns BP2 may be disposed on the first sensing insulating layer IS-IL1 and may be defined as a first electrode portion of the first conductive layer IS-CL1.

Each of the first sensing patterns SP1 may include a first portion SP1a, a second portion SP1b, and a third portion SP1c.

The first portion SP1a may extend in the second direction DR2. One end of the first portion SP1a may be connected to one first connection pattern BP1, and the other end of the first portion SP1a may be connected to another first connection pattern BP1. The first portion SP1a may be referred to as a trunk portion. Since the first connection patterns BP1 and the first sensing patterns SP1 have a single connected structure, the first connection patterns BP1 may be defined as portions of the first portion SP1a.

The second portion SP1b may protrude from the first portion SP1a to the first direction DR1. For example, the second portion SP1b may protrude in a direction away from a center area of the first portion SP1a. The second portion SP1b may be referred to as a protrusion portion.

A plurality of the third portions SP1c may be provided. The third portions SP1c may extend in a fourth direction DR4 or a fifth direction DR5 from the first portion SP1a. Some portions of the third portions SP1c may extend in the fourth direction DR4, and the other portions of the third portions SP1c may extend in the fifth direction DR5. Each of the third portions SP1c may be referred to as a "branch portion".

The fourth direction DR4 may be a direction crossing the first direction DR1 and the second direction DR2. For example, the fourth direction DR4 may be a direction between the first direction DR1 and the second direction DR2. The fifth direction DR5 may be a direction crossing the fourth direction DR4. For example, the fourth direction DR4 and the fifth direction DR5 may be substantially perpendicular to each other.

Each of the second sensing patterns SP2 may have a shape corresponding to a shape of the first sensing patterns SP1 adjacent thereto. Each of the second sensing patterns SP2 may surround at least two third portions SP1c of each of the first sensing patterns SP1 adjacent thereto.

The sensing lines SL-T, SL-R1, and SL-R2 may overlap the peripheral area NAR and may be disposed on the second sensing insulating layer IS-IL2. The sensing lines SL-T, SL-R1, and SL-R2 may be formed on the second sensing insulating layer IS-IL2 through the same process as the first sensing electrodes E1 and the second sensing electrodes E2.

The sensing lines SL-T, SL-R1, and SL-R2 may include first sensing lines SL-T and second sensing lines SL-R1 and SL-R2. The pad portions PD1, PD2a, and PD2b may overlap the peripheral area NAR and may include first sensing pads PD1, first sub-sensing pads PD2a, and second sub-sensing pads PD2b. The first sensing pads PD1 may be disposed between the first sub-sensing pads PD2a and the second sub-sensing pads PD2b.

One ends of the first sensing lines SL-T may be electrically connected to the first sensing electrodes E1, respectively, and the other ends of the first sensing lines SL-T may be electrically connected to the first sensing pads PD1, respectively.

The second sensing lines SL-R1 and SL-R2 may include first sub-sensing lines SL-R1 disposed at a left side with respect to the second sensing electrodes E2 and second sub-sensing lines SL-R2 disposed at a right side with respect to the second sensing electrodes E2. The first sensing lines SL-T may be disposed between the first sub-sensing lines SL-R1 and the second sub-sensing lines SL-R2.

One ends of the first sub-sensing lines SL-R1 may be electrically connected to some second sensing electrodes among the second sensing electrodes E2, respectively, and the other ends of the first sub-sensing lines SL-R1 may be electrically connected to the first sub-sensing pads PD2a, respectively.

One ends of the second sub-sensing lines SL-R2 may be electrically connected to the other second sensing electrodes among the second sensing electrodes E2, respectively, and the other ends of the second sub-sensing lines SL-R2 may be electrically connected to the second sub-sensing pads PD2b, respectively.

However, the connection structure of the sensing lines SL-T, SL-R1, and SL-R2 should not be limited to the exemplary embodiment shown in FIG. 6 and may be changed to have various shapes.

According to the exemplary embodiment of the present invention, each of the sensing lines SL-T, SL-R1, and SL-R2 may have a double-layered invention. Each of the sensing lines SL-T, SL-R1, and SL-R2 may be electrically in contact with an auxiliary sensing line (not shown) disposed on the first sensing insulating layer IS-IL1 through at least one contact hole defined through the second sensing insulating layer IS-IL2. The sensing lines SL-T, SL-R1, and SL-R2 may correspond to the second line portion of the second conductive layer IS-CL2.

A plurality of the auxiliary sensing lines may be provided to respectively correspond to the sensing lines SL-T, SL-R1, and SL-R2, and may be disposed on the first sensing insulating layer IS-IL1. The auxiliary sensing lines may correspond to the first line portion of the first conductive layer IS-CL1.

As described above, since the sensing lines SL-T, SL-R1, and SL-R2 electrically make contact with the auxiliary sensing lines disposed on different layers from each other, respectively, reliability of the electrical signals transmitted to the sensing electrodes E1 and E2 may be improved. For instance, although some of the sensing lines are disconnected, the electrical signals may be transmitted to the sensing electrodes through the auxiliary sensing lines electrically making contact with the sensing lines. Details on the above will be described with reference to FIGS. 8A and 8B.

The dummy patterns DMP may be spaced apart from the first sensing patterns SP1 and the second sensing patterns SP2. The dummy patterns DMP may be formed on the second sensing insulating layer IS-IL2 through the same process as the first sensing patterns SP1 and the second sensing patterns SP2. Accordingly, the dummy patterns DMP may include the same material as and may have the same stack structure as the first sensing patterns SP1, the second sensing patterns SP2, and the sensing lines SL-T, SL-R1, and SL-R2. The dummy patterns DMP may be referred to as "auxiliary patterns", "additional patterns", "sub-patterns", or "boundary patterns".

The dummy patterns DMP may include a first pattern DMPa and a second pattern DMPb. The first pattern DMPa may be disposed between the first sensing pattern SP1 and the second sensing pattern SP2. The second pattern DMPb may be disposed between the second sensing patterns SP2. For example, the second pattern DMPb may be disposed between two second sensing patterns SP2 adjacent to each other in the second direction DR2, and thus, the two second sensing patterns SP2 may be spaced apart from each other.

The second pattern DMPb may include a first boundary pattern MP1 and second boundary patterns MP2. The first boundary pattern MP1 may have a lozenge shape in a plan view. The second boundary patterns MP2 may be spaced apart from each other with the first boundary pattern MP1 interposed therebetween. Each of the second boundary patterns MP2 may extend in the first direction DR1. Each of the second boundary patterns MP2 may be connected to the first boundary pattern MP1 and the first pattern DMPa.

As the first pattern DMPa is disposed between the first sensing patterns SP1 and the second sensing patterns SP2 and the second pattern DMPb is disposed between the second sensing patterns SP2, a visibility of a boundary area between the first sensing patterns SP1 and the second sensing patterns SP2 and a boundary area between the second sensing patterns SP2 may be reduced.

Some dummy patterns among the dummy patterns DMP may be floating electrodes that are not electrically connected to the first sensing patterns SP1 and the second sensing patterns SP2. Alternatively, some dummy patterns among the dummy patterns DMP may be grounded. The other dummy patterns among the dummy patterns DMP may be connected to the first sensing patterns SP1 or the second sensing patterns SP2 to improve a sensitivity of the sensing unit ISU.

Referring to FIGS. 7A and 7B, each of the first sensing patterns SP1, the first connection patterns BP1, the second sensing patterns SP2, the second connection patterns BP2, and the dummy patterns DMP may have a mesh structure. Boundaries BD between the first sensing patterns SP1, the second sensing patterns SP2, and the dummy patterns DMP may be defined by removing portions of the mesh structure. In FIG. 7A, the boundaries BD are indicated by solid lines to clearly show the boundaries BD. The removed portions of the mesh structures shown in FIG. 7B may correspond to the boundaries BD. In addition, disconnection portions CTP defined by removing portions of the mesh structures may be further provided to prevent the boundaries from being viewed.

Figure 8A:
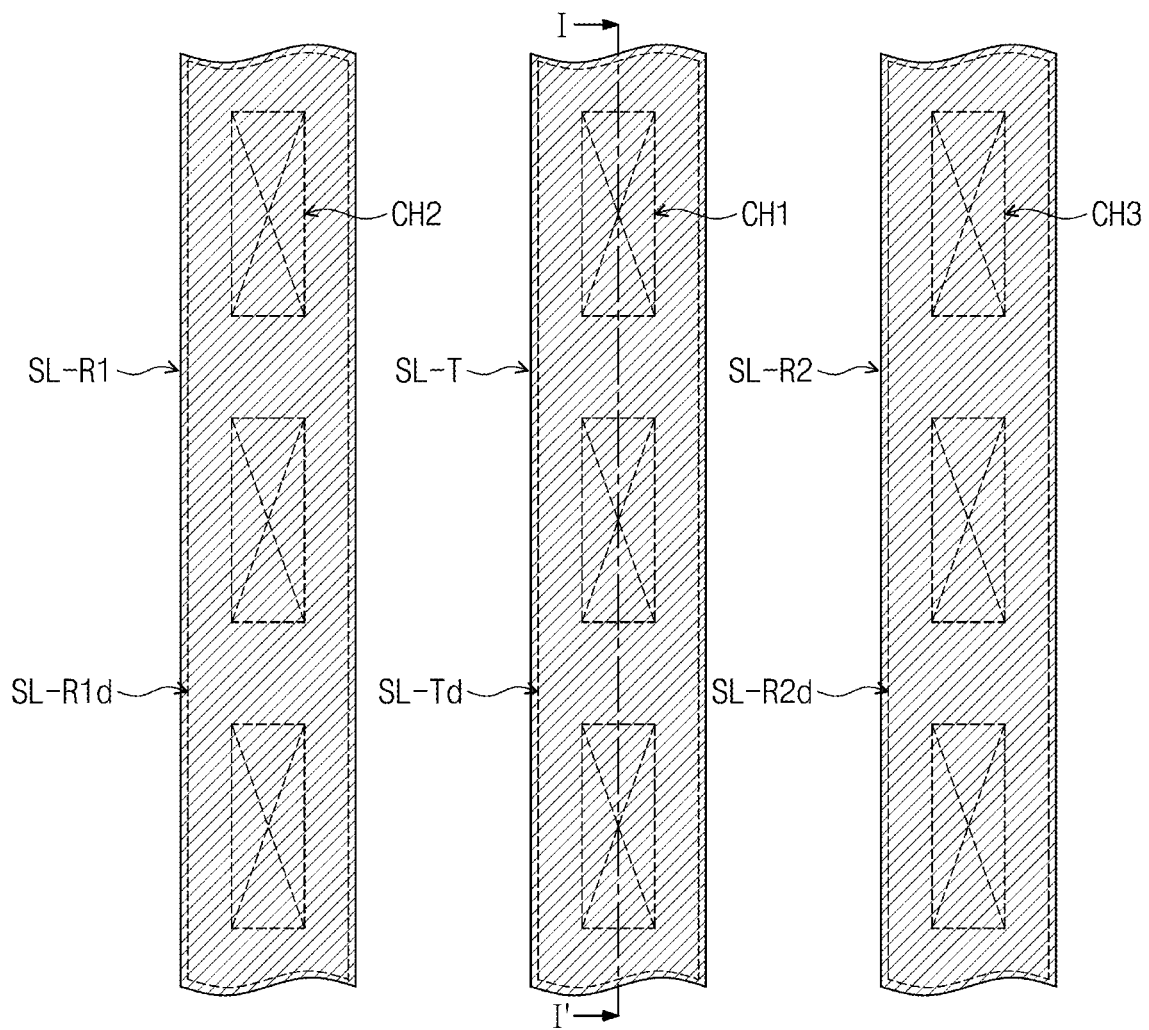
FIG. 8A is a plan view showing sensing signal lines shown in FIG. 6 according to an exemplary embodiment of the present invention.
Figure 8B:
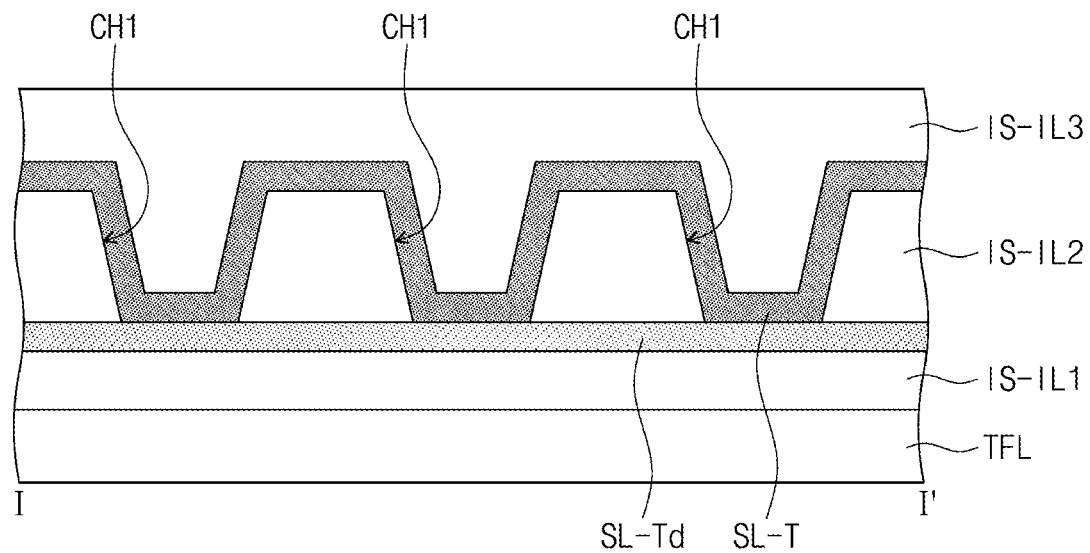
FIG. 8B is a cross-sectional view taken along a line I-I' shown in FIG. 8A according to an exemplary embodiment of the present invention.

FIG. 8A is a plan view showing the sensing signal lines shown in FIG. 6 according to an exemplary embodiment of the present invention. FIG. 8B is a cross-sectional view taken along a line I-I' shown in FIG. 8A according to an exemplary embodiment of the present invention.

As described with reference to FIG. 6, each of the sensing lines SL-T, SL-R1, and SL-R2 may have a double-layered structure. That is, the sensing lines SL-T, SL-R1, and SL-R2 may be electrically in contact with the auxiliary sensing lines disposed on different layers from each other, respectively. According to the present exemplary embodiment, each of the sensing lines SL-T, SL-R1, and SL-R2 may have substantially the same double-layered structure.

Referring to FIGS. 8A and 8B, each of the first sensing lines SL-T may be electrically in contact with a first auxiliary sensing line SL-Td through a plurality of first contact holes CH1 spaced apart from each other in a plan view.

A plurality of the first auxiliary sensing lines SL-Td may be provided to correspond to the number of the first sensing lines SL-T and may be disposed on the first sensing insulating layer IS-IL1. The first sensing lines SL-T may overlap the first auxiliary sensing lines SL-Td and may be disposed on the second sensing insulating layer IS-IL2. The first sensing lines SL-T may be electrically in contact with the first auxiliary sensing lines SL-Td through the first contact holes CH1 defined through the second sensing insulating layer IS-IL2, respectively.

Each of the first sub-sensing lines SL-R1 may be electrically in contact with a second auxiliary sensing line SL-R1d through a plurality of second contact holes CH2 spaced apart from each other in a plan view. Similarly, the first sub-sensing lines SL-R1 may be electrically in contact with the second auxiliary sensing lines SL-R1d through the second contact holes CH2 defined through the second sensing insulating layer IS-IL2, respectively.

Each of the second sub-sensing lines SL-R2 may be electrically in contact with a third auxiliary sensing line SL-R2d through a plurality of third contact holes CH3 spaced apart from each other in a plan view. Similarly, the second sub-sensing lines SL-R2 may be electrically in contact with the third auxiliary sensing lines SL-R2d through the third contact holes CH3 defined through the second sensing insulating layer IS-IL2, respectively.

Figure 9:
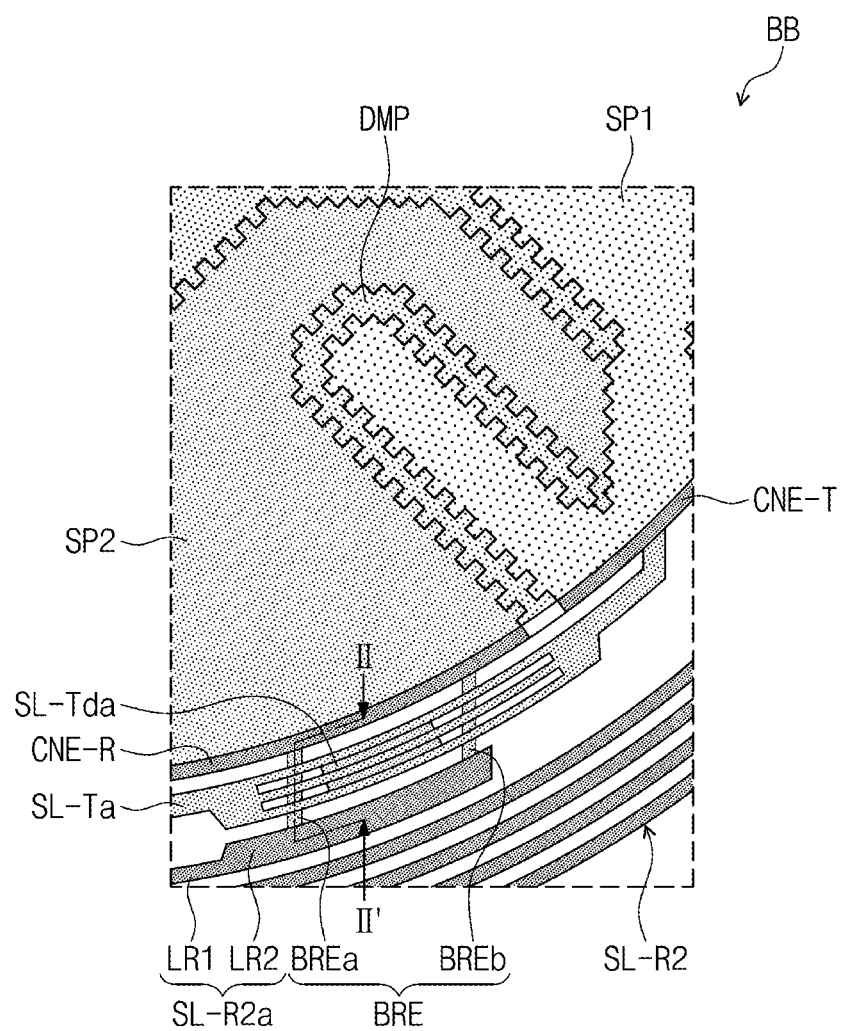
FIG. 9 is an enlarged view showing an area BB shown in FIG. 6 according to an exemplary embodiment of the present invention.
Figure 10:
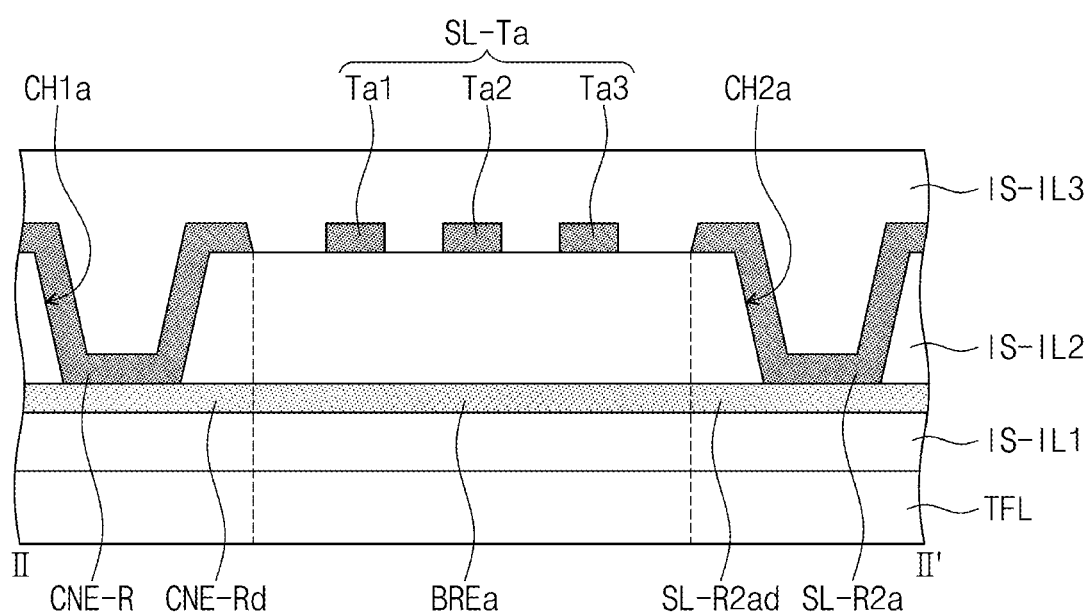
FIG. 10 is a cross-sectional view taken along a line II-IF shown in FIG. 9 according to an exemplary embodiment of the present invention.

FIG. 9 is an enlarged view showing an area BB shown in FIG. 6 according to an exemplary embodiment of the present invention. FIG. 10 is a cross-sectional view taken along a line II-IF shown in FIG. 9 according to an exemplary embodiment of the present invention.

Referring to FIGS. 5 and 9, the sensing unit ISU may further include first connection electrodes CNE-T respectively connected to ends of the first sensing patterns SP1 and second connection electrodes CNE-R respectively connected to ends of the second sensing patterns SP2. The first connection electrodes CNE-T may be spaced apart from each other and may be formed on the second sensing insulating layer IS-IL2 through the same process as the first sensing patterns SP1. The second connection electrodes CNE-R may be spaced apart from each other and may be formed on the second sensing insulating layer IS-IL2 through the same process as the second sensing patterns SP2. According to the present exemplary embodiment, the first connection electrodes CNE-T and the second connection electrodes CNE-R may be formed on the second sensing insulating layer IS-IL2 through the same process.

Each of the first connection electrodes CNE-T and the second connection electrodes CNE-R may be connected to the end of the corresponding sensing pattern of the sensing patterns SP1 and SP2 having the mesh structure at at least two points. In this case, the end of the sensing pattern may mean a portion adjacent to the peripheral area NAR.

According to the present invention, each of the first connection electrodes CNE-T and the second connection electrodes CNE-R may have the double-layered structure. For instance, the first connection electrodes CNE-T may be electrically in contact with first auxiliary connection electrodes (not shown), respectively, through contact holes defined through the second sensing insulating layer IS-IL2. The second connection electrodes CNE-R may be electrically in contact with second auxiliary connection electrodes (not shown), respectively, through contact holes defined through the second sensing insulating layer IS-IL2. The first auxiliary connection electrodes and the second auxiliary connection electrodes may be formed on the first sensing insulating layer IS-IL1.

In detail, as shown in FIG. 6, the first sensing lines SL-T may be disposed between the first sub-sensing lines SL-R1 and the second sub-sensing lines SL-R2 and may be electrically connected to one ends of the first sensing electrodes E1. The one ends of the first sensing electrodes E1 may be areas adjacent to the pad portions PD1, PD2a, and PD2b (refer to FIG. 6).

As shown in FIG. 9, the first sensing lines SL-T may include a first sensing line SL-Ta, and the second sub-sensing lines SL-R2 may include a second sensing line SL-R2a. The first sensing line SL-Ta may be closest to the second sub-sensing lines SL-R2 among the first sensing lines SL-T, and the second sensing line SL-R2a may be closest to the first sensing lines SL-T among the second sub-sensing lines SL-R2.

The first sensing line SL-Ta may be electrically connected to a corresponding first connection electrode CNE-T among the first connection electrodes CNE-T. The first connection electrode CNE-T may be connected to one end of one first sensing electrode E1 among the first sensing electrodes E1. The first connection electrode CNE-T may be connected directly to the first sensing pattern SP1 of the first sensing electrode E1. The first sensing line SL-Ta may be disposed on the same layer as the first connection electrode CNE-T.

The second sensing line SL-R2a may be electrically connected to one second connection electrode CNE-R among the second connection electrodes CNE-R. The second connection electrode CNE-R may be connected to one end of one second sensing electrode E2 adjacent to the one end of the first sensing electrode E1 among the second sensing electrodes E2. The second connection electrode CNE-R may be connected directly to the second sensing pattern SP2 of the second sensing electrode E2. The second sensing line SL-R2a may be disposed on the same layer as the second connection electrode CNE-R and may be formed through the same process as the first sensing line SL-Ta and the first connection electrode CNE-T.

The first sensing line SL-Ta according to the present invention may be disposed between the second connection electrode CNE-R and second sensing line SL-R2a in a plan view. In particular, one end of the second sensing line SL-R2a may be spaced apart from the second connection electrode CNE-R with the first sensing line SL-Ta interposed therebetween. As a result, the second sensing line SL-R2a may be electrically separated from the second connection electrode CNE-R by the first sensing line SL-Ta.

According to the exemplary embodiment of the present invention, the sensing unit ISU may include a connection portion BRE disposed on a different layer from the first sensing line SL-Ta and the second sensing line SL-R2a. The connection portion BRE may be formed on the first sensing insulating layer IS-IL1 and may correspond to the first line portion of the first conductive layer IS-CL1. The connection portion BRE may electrically connect the second sensing line SL-R2a to the second connection electrode CNE-R through contact holes defined through the second sensing insulating layer IS-IL2. As a result, the electrical signal transmitted through the second sensing line SL-R2a may be applied to the second sensing pattern SP2 through the connection portion BRE and the second connection electrode CNE-R.

In particular, according to the present invention, the second sensing line SL-R2a may include a first line area LR1 and a second line area LR2, which have different line widths from each other. The connection portion BRE may be connected to the second auxiliary sensing line overlapping the second line area LR2 having the line width greater than the first line area LR1.

The connection portion BRE may include a first connection line BREa and a second connection line BREb. Each of the first connection line BREa and the second connection line BREb may be disposed on the first sensing insulating layer IS-IL1 corresponding to the first conductive layer IS-CL1.

According to the present invention, the first connection line BREa may intersect the first sensing line SL-Ta disposed on another layer in a plan view. In addition, the first connection line BREa may not overlap a first auxiliary sensing line SL-Tda electrically making contact with the first sensing line SL-Ta, which will be described with reference to FIG. 11.

That is, the first connection line BREa may be spaced apart from the first auxiliary sensing line SL-Tda and may include one end electrically connected to the second connection electrode CNE-R and the other end electrically connected to the second sensing line SL-R2b.

In detail, referring to FIG. 10, the second sensing insulating layer IS-IL2 may define a first contact hole CH1a and a second contact hole CH2a. The second connection electrode CNE-R may be electrically connected to a second auxiliary connection electrode CNE-Rd through the first contact hole CH1a. The second sensing line SL-R2a may be electrically connected to a second auxiliary sensing line SL-R2ad through the second contact hole CH2a.

One end of the first connection line BREa may be connected to the second auxiliary connection electrode CNE-Rd, and the other end of the first connection line BREa may be connected to the second auxiliary sensing line SL-R2ad. According to the present invention, the first connection line BREa, the second auxiliary connection electrode CNE-Rd, and the second auxiliary sensing line SL-R2ad may be formed on the first sensing insulating layer IS-IL1 in an integral shape through the same process.

The electrical signal transmitted through the second sensing line SL-R2a may be applied to the second connection electrode CNE-R through the second auxiliary sensing line SL-R2ad, the first connection line BREa, and the second auxiliary connection electrode CNE-Rd. As a result, the electrical signal may be transmitted to the second sensing pattern SP2 connected to the second connection electrode CNE-R.

The first sensing line SL-Ta may overlap at least a portion of the first connection line BREa and may be disposed on the second sensing insulating layer IS-IL2. When viewed in a plan view, the first connection line BREa may intersect the first sensing line SL-Ta.

In particular, the first sensing line SL-Ta may overlap the first connection line BREa and may include a first portion Ta1, a second portion Ta2, and a third portion Ta3, which are spaced apart from each other in a plan view. The first portion Ta1, the second portion Ta2, and the third portion Ta3 may be disposed between the second connection electrode CNE-R and the second sensing line SL-R2a.

Referring to FIG. 9 again, the second connection line BREb may be spaced apart from the first connection line BREa and may intersect the first sensing line SL-Ta. In addition, the second connection line BREb may not overlap the first auxiliary sensing line SL-Tda that electrically makes contact with the first sensing line SL-Ta, which will be described with reference to FIG. 11. The second connection line BREb may be spaced apart from the first auxiliary sensing line SL-Tda when viewed in a plan view and may include one end electrically connected to the second connection electrode CNE-R and the other end electrically connected to the second sensing line SL-R2b.

In addition, although not shown, the second connection line BREb may have substantially the same structure as the first connection line BREa shown in FIG. 10. For instance, one end of the second connection line BREb may be connected to the second auxiliary connection electrode CNE-Rd, and the other end of the second connection line BREb may be connected to the second auxiliary sensing line SL-R2ad.

The electrical signal transmitted through the second sensing line SL-R2a may be applied to the second connection electrode CNE-R through the second auxiliary sensing line SL-R2ad, the second connection line BREb, and the second auxiliary connection electrode CNE-Rd. As a result, the electrical signal may be transmitted to the second sensing pattern SP2 connected to the second connection electrode CNE-R.

As described above, the second sensing line SL-R2a according to the present invention may be separated from the second connection electrode CNE-R by the first sensing line SL-Ta. However, the second sensing line SL-R2a and the second connection electrode CNE-R may be electrically connected to each other by the connection portion BRE. FIG. 9 shows the connection portion BRE that includes two connection lines BREa and BREb. However, the inventive concepts should not be limited thereto. That is, the connection portion BRE may include at least one connection line that connects the second sensing line SL-R2a and the second connection electrode CNE-R.

Figure 11:
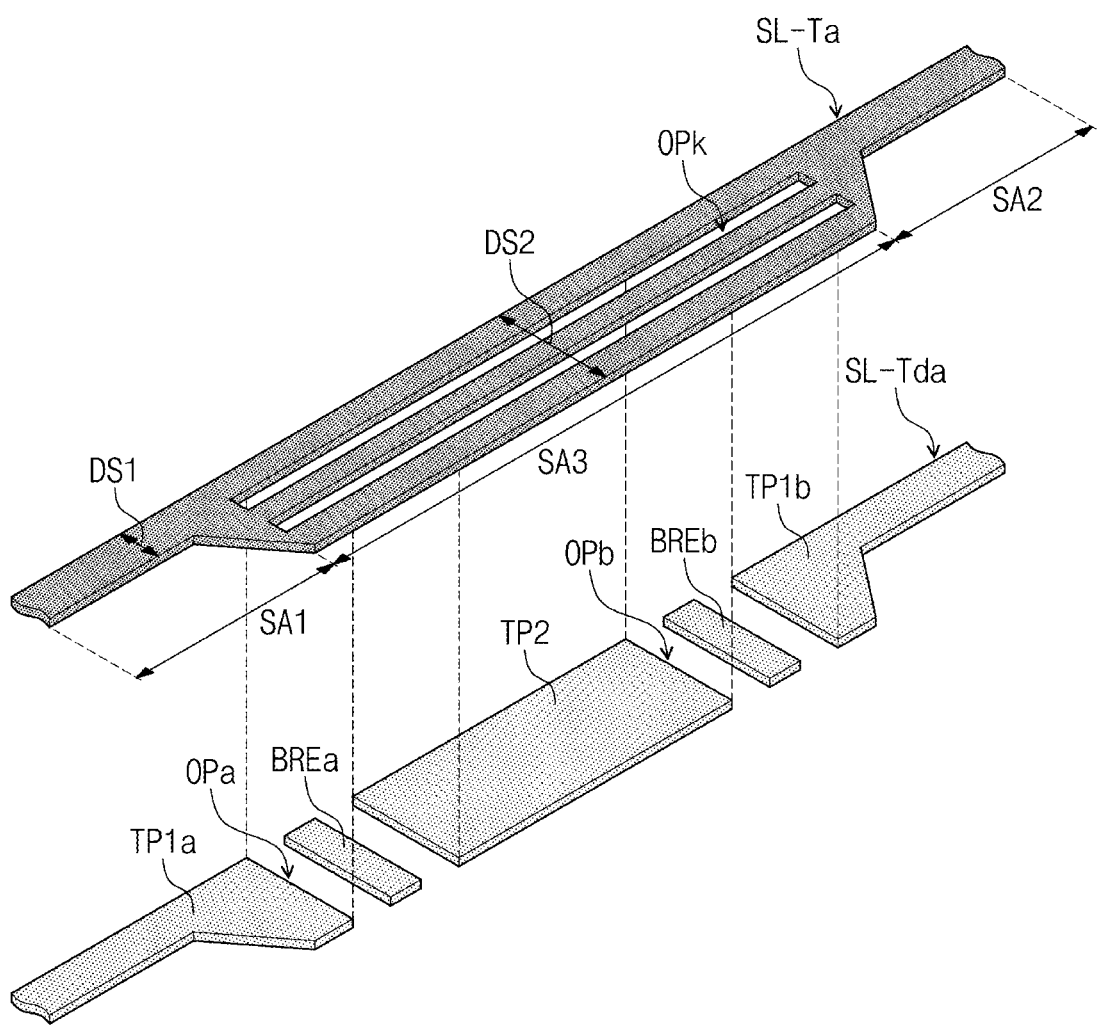
FIG. 11 is an exploded perspective view showing a first sensing line and a first auxiliary sensing line shown in FIG. 9 according to an exemplary embodiment of the present invention.

FIG. 11 is an exploded perspective view showing the first sensing line SL-Ta and the first auxiliary sensing line SL-Tda shown in FIG. 9 according to an exemplary embodiment of the present invention Referring to FIGS. 9 and 11, the first sensing line SL-Ta among the first sensing lines SL-T may include first and second line portions SA1 and SA2, each having a first line width DS1, and a third line portion SA3 having a second line width DS2 greater than the first line width DS1. The third line portion SA3 may be disposed between the first line portions SA1 and SA2.

One end of the first line portion SA1 may be connected to a corresponding second sub-sensing pad among the second sub-sensing pads PD2b, and the other end of the first line portion SA1 may be connected to one end of the third line portion SA3. One end of the second line portion SA2 may be connected to the first connection electrode CNE-T, and the other end of the second line portion SA2 may be connected to the other end of the third line portion SA3. The first line portion SA1, the second line portion SA2, and the third line portion SA3 may be integrally formed with each other.

According to the exemplary embodiment of the present invention, the third line portion SA3 may be provided with at least one opening OPk defined therethrough and extending in a longitudinal direction of the first sensing line SL-Ta. FIG. 11 shows two openings OPk as a representative example.

The third line portion SA3 may include the first portion Ta1, the second portion Ta2, and the third portion Ta3, which are spaced apart from each other in the plan view shown in FIG. 10. Each of the first portion Ta1, the second portion Ta2, and the third portion Ta3 may have a line width less than a line width of each of the first sensing lines except for the first sensing line SL-Ta among the first sensing lines SL-T.

In particular, the first connection line BREa and the second connection line BREb may cross the third line portion SA3 in a plan view. A coupling between the first connection line BREa and the third line portion SA3 that cross each other may be reduced through the openings OPk defined through the third line portion SA3. Similarly, a coupling between the second connection line BREb and the third line portion SA3 that cross each other may be reduced through the openings OPk defined through the third line portion SA3.

In addition, as shown in FIG. 9, the second line width DS2 of the third line portion SA3 may be greater than the line width of the second sensing line SL-R2a.

The first auxiliary sensing line SL-Tda may include first auxiliary portions TP1a and TP1b respectively overlapping the first and second line portions SA1 and SA2, and a second auxiliary portion TP2 overlapping the third line portion SA3. The second auxiliary portion TP2 may be disposed between the first auxiliary portions TP1a and TP1b and may be spaced apart from the first auxiliary portions TP1a and TP1b.

According to the present invention, the first connection line BREa and the second connection line BREb may be respectively disposed in spaces OPa and OPb between the second auxiliary portion TP2 and the first auxiliary portion TP1a and between the second auxiliary portion TP2 and the first auxiliary portion TP1b. The first connection line BREa and the second connection line BREb may be electrically separated from the first auxiliary sensing line SL-Tda by the spaces OPa and OPb.

Figure 12:
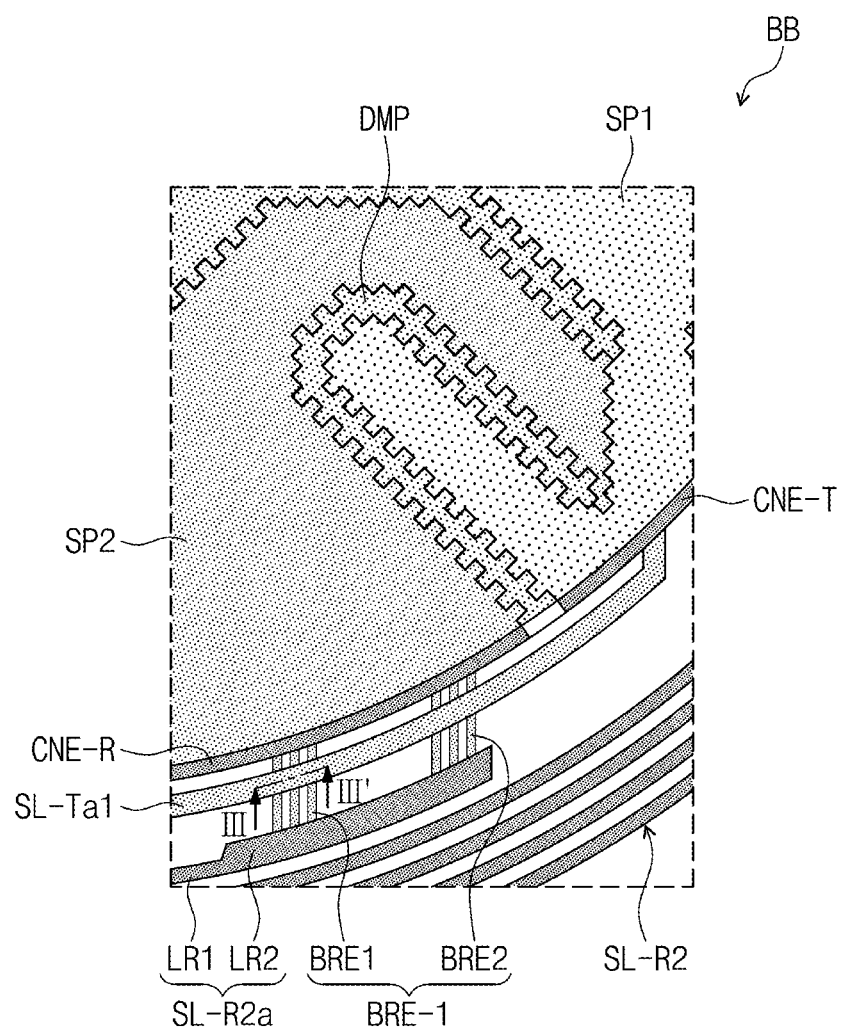
FIG. 12 is an enlarged view showing an area BB shown in FIG. 6 according to another exemplary embodiment of the present invention.
Figure 13:
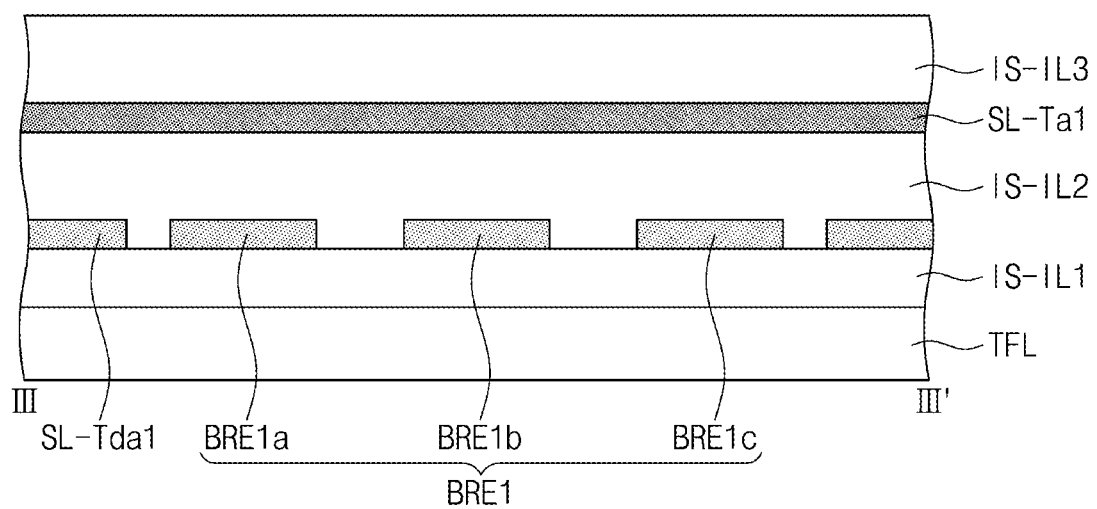
FIG. 13 is a cross-sectional view taken along a line shown in FIG. 12 according to another exemplary embodiment of the present invention.

FIG. 12 is an enlarged view showing an area BB shown in FIG. 6 according to another exemplary embodiment of the present invention. FIG. 13 is a cross-sectional view taken along a line shown in FIG. 12 according to another exemplary embodiment of the present invention.

Referring to FIGS. 12 and 13, the first sensing line SL-Ta1 may have a constant line width. That is, the first sensing lines SL-T may have the same line width as each other.

The connection portion BRE-1 may correspond to a first line portion of a first conductive layer IS-CL1 and may include a first connection line BRE1 and a second connection line BRE2. As described with reference to FIG. 9, each of the first connection line BRE1 and the second connection line BRE2 may electrically connect a second connection electrode CNE-R and a second sub sensing line SL-R2.

Each of the first connection line BRE1 and the second connection line BRE2 of the connection portion BRE-1 may include at least one sub-connection lines crossing the first sensing line SL-Ta1. According to the present invention, each of the first connection line BRE1 and the second connection line BRE2 may include three sub-connection lines. However, the number of the sub-connection lines may vary.

As shown in FIG. 13, the first connection line BRE1 may include three sub-connection lines BRE1a, BRE1b, and BRE1c spaced apart from each other in a plan view. At least a portion of each of the three sub-connection lines BRE1a, BRE1b, and BRE1c may overlap the first sensing line SL-Ta1.

In addition, the three sub-connection lines BRE1a, BRE1b, and BRE1c may not overlap a first auxiliary line SL-Tda1. For instance, the three sub-connection lines BRE1a, BRE1b, and BRE1c may be disposed in the spaces OPa and OPb described with reference to FIG. 11.

According to the above, the input sensing layer includes the first sensing line connected to the first sensing pattern and the second sensing line connected to the second sensing pattern spaced apart from the first sensing pattern. The first sensing line is disposed between the connection electrode and the second sensing line in a plan view.

The connection portion crosses the first sensing line in the plan view, is disposed on the first insulating layer, and electrically connects the second sensing line to the connection electrode through the contact holes defined through the second insulating layer. As a result, the electrical signals transmitted through the second sensing line are transmitted to the sensing pattern through the connection portion and the connection electrode.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A sensing unit comprising:
   a first conductive layer comprising a first line portion comprising a first auxiliary sensing line, a second auxiliary sensing line, and a connection line having one end connected to the second auxiliary sensing line;
   an insulating layer disposed on the first conductive layer; and
   a second conductive layer disposed on the insulating layer, the second conductive layer comprising:
   an electrode portion comprising a first sensing pattern and a second sensing pattern spaced apart from the first sensing pattern in a plan view; and
   a second line portion comprising a first sensing line overlapping the first auxiliary sensing line and electrically connected to the first sensing pattern and a second sensing line overlapping the second auxiliary sensing line and spaced apart from the first sensing line,
   wherein the first sensing line is disposed between the second sensing pattern and the second sensing line, and the connection line does not overlap the first auxiliary sensing line, crosses the first sensing line in the plan view, and electrically connects the second sensing line to the second sensing pattern through contact holes defined through the insulating layer.

2. The sensing unit of claim 1, wherein the second conductive layer further comprises a connection electrode connected to an end of the second sensing pattern, and the first conductive layer further comprises an auxiliary connection electrode electrically connected to the connection electrode through a first contact hole among the contact holes and connected to the other end of the connection line.

3. The sensing unit of claim 2, wherein the first sensing line is disposed between the connection line and the second sensing line, and the second sensing line is electrically connected to the second auxiliary sensing line through a second contact hole among the contact holes.

4. The sensing unit of claim 1, wherein the first sensing line comprises a first line portion having a first line width and a second line portion having a second line width greater than the first line width, and the connection line crosses the second line portion in the plan view.

5. The sensing unit of claim 4, wherein the second line portion of the first sensing line is greater than a line width of the second sensing line.

6. The sensing unit of claim 4, wherein an opening is defined through the second line portion of the first sensing line and extends in a longitudinal direction of the first sensing line, and the connection line overlaps the opening.

7. The sensing unit of claim 4, wherein the first auxiliary sensing line comprises a first auxiliary portion overlapping the first line portion and a second auxiliary portion overlapping the second line portion and spaced apart from the first auxiliary portion, and the connection line is disposed in a space between the first auxiliary portion and the second auxiliary portion.

8. The sensing unit of claim 1, wherein the second sensing line comprises a first line area and a second line area, which have different line widths from each other, and the connection line is connected to the second auxiliary sensing line overlapping the second line area having a line width greater than the first line area.

9. The sensing unit of claim 1, wherein the connection line comprises:
a first connection line crossing the first sensing line and electrically connecting the second sensing line and the second sensing pattern; and
a second connection line spaced apart from the first connection line, crossing the first sensing line, and electrically connecting the second sensing line and the second sensing pattern.

10. The sensing unit of claim 9, wherein each of the first connection line and the second connection line comprises a plurality of sub-connection lines crossing the first sensing line and spaced apart from each other.

11. The sensing unit of claim 1, wherein the electrode portion further comprises:
a plurality of first sensing electrodes extending in a first direction and arranged in a second direction perpendicular to the first direction, each of the first sensing electrodes comprising a plurality of the first sensing patterns and first connection patterns connecting the first sensing patterns; and
a plurality of second sensing electrodes arranged in the first direction and extending in the second direction, each of the second sensing electrodes comprising a plurality of the second sensing patterns, and the second line portion further comprises a plurality of first sensing lines respectively connected to the first sensing electrodes and a plurality of second sensing lines respectively connected to the second sensing electrodes.

12. The sensing unit of claim 11, wherein the first sensing line is one first sensing line closest to the second sensing lines among the first sensing lines, and the second sensing line is one second sensing line closest to the first sensing lines among the second sensing lines.

13. The sensing unit of claim 11, wherein the second sensing lines comprise first sub-sensing lines and second sub-sensing lines spaced apart from the first sub-sensing lines with the second sensing electrodes interposed therebetween, the first sub-sensing lines are respectively connected to one ends of corresponding second sensing electrodes among the second sensing electrodes, and the second sub-sensing lines are respectively connected to the other ends of the other corresponding second sensing electrodes among the second sensing electrodes.

14. The sensing unit of claim 11, wherein the first conductive layer comprises second connection patterns that electrically connect the second sensing patterns to each other.

15. A display device comprising:
a display panel; and
a sensing unit disposed on the display panel and comprising a sensing area and a peripheral area adjacent to the sensing area, which are defined therein, the sensing unit comprising:
an electrode portion disposed on the sensing area and comprising a first sensing electrode and a second sensing electrode spaced apart from the first sensing electrode in a plan view;
a line portion overlapping the peripheral area and comprising a first sensing line connected to the first sensing electrode and a second sensing line spaced apart from the first sensing line; and
a connection line disposed on a different layer from the first sensing line and the second sensing line, the connection line electrically connecting the second sensing line and the second sensing electrode,
wherein:
the connection line crosses the first sensing line disposed between the second sensing electrode and the second sensing line in a plan view and is insulated from the first sensing line; and
the sensing unit comprises:
a first insulating layer disposed on the display panel;
a second insulating layer covering the connection line disposed on the first insulating layer; and
a third insulating layer covering the electrode portion and the line portion, which are disposed on the second insulating layer.

16. The display device of claim 15, further comprising a connection electrode connected to an end of the second sensing electrode,
wherein one end of the connection line is electrically connected to the connection electrode, and the other end of the connection line is electrically connected to the second sensing line.

17. The display device of claim 15, wherein each of the first sensing line and the second sensing line comprises:
a first line disposed on the first insulating layer; and
a second line overlapping the first line, disposed on the second insulating layer, and electrically connected to the first line through a plurality of contact holes defined through the second insulating layer.

18. A sensing unit comprising:
a first insulating layer comprising an sensing area and a peripheral area adjacent to the sensing area;
a first conductive layer disposed on the first insulating layer and comprising a connection line overlapping the peripheral area and a first electrode portion disposed on the sensing area;
a second insulating layer disposed on the first conductive layer; and
a line portion disposed on the second insulating layer and comprising a second electrode portion comprising first and second sensing electrodes disposed on the sensing area and spaced apart from each other, a first sensing line overlapping the peripheral area and connected to the first sensing electrode, and a second sensing line spaced apart from the second sensing electrode with the first sensing line interposed therebetween,
wherein the connection line crosses the first sensing line in a plan view and electrically connects the second sensing electrode and the second sensing line through a contact hole defined through the second insulating layer.

19. The display device of claim 18, wherein the contact hole comprises a first contact hole through which the second sensing electrode is electrically connected to one end of the connection line and a second contact hole through which the second sensing line is electrically connected to the other end of the connection line, and the first sensing line overlaps a space between the first contact hole and the second contact hole.

* * * * *